United States Patent [19]
Uenaka

[11] Patent Number: 5,291,235
[45] Date of Patent: Mar. 1, 1994

[54] AUTOMATIC FOCUSING DEVICE

[75] Inventor: Yukio Uenaka, Tokyo, Japan

[73] Assignee: Asahi Kogaku Kogyo Kabushiki Kaisha, Tokyo, Japan

[21] Appl. No.: 76,693

[22] Filed: Jun. 15, 1993

Related U.S. Application Data

[63] Continuation of Ser. No. 800,463, Nov. 29, 1991, abandoned.

[30] Foreign Application Priority Data

| Nov. 29, 1990 | [JP] | Japan | 2-332865 |
| Feb. 8, 1991 | [JP] | Japan | 3-103988 |
| Feb. 8, 1991 | [JP] | Japan | 3-103989 |
| Feb. 8, 1991 | [JP] | Japan | 3-103990 |
| Feb. 13, 1991 | [JP] | Japan | 3-104057 |
| Feb. 13, 1991 | [JP] | Japan | 3-104058 |
| Feb. 13, 1991 | [JP] | Japan | 3-104059 |
| Feb. 13, 1991 | [JP] | Japan | 3-104060 |

[51] Int. Cl.$^5$ .............................................. G03B 13/36
[52] U.S. Cl. ................... 354/402; 354/195.1
[58] Field of Search ............... 354/402, 406, 407, 408, 354/195.1

[56] References Cited

U.S. PATENT DOCUMENTS

| 4,593,988 | 6/1986 | Akiyama et al. |
| 4,783,677 | 11/1988 | Hamada et al. |
| 4,969,003 | 11/1990 | Ohnuki et al. |
| 4,974,002 | 11/1990 | Ohnuki et al. |
| 4,980,715 | 12/1990 | Utagawa |

(List continued on next page.)

FOREIGN PATENT DOCUMENTS

| 0347042 | 12/1989 | European Pat. Off. |
| 347042 | 12/1989 | European Pat. Off. |
| 349736 | 1/1990 | European Pat. Off. |
| 0349736 | 1/1990 | European Pat. Off. |
| 0364137 | 4/1990 | European Pat. Off. |
| 364137 | 4/1990 | European Pat. Off. |
| 0441380 | 8/1991 | European Pat. Off. |
| 60-214325 | 10/1985 | Japan . |
| 61-45233 | 3/1986 | Japan . |
| 62-125311 | 6/1987 | Japan . |
| 62-139511 | 6/1987 | Japan . |
| 62-139512 | 6/1987 | Japan . |
| 62-211624 | 9/1987 | Japan . |
| 62-253107 | 11/1987 | Japan . |
| 62-269914 | 11/1987 | Japan . |
| 62-269915 | 11/1987 | Japan . |
| 62-269916 | 11/1987 | Japan . |
| 62-269917 | 11/1987 | Japan . |
| 62-269918 | 11/1987 | Japan . |
| 62-269919 | 11/1987 | Japan . |
| 62-269920 | 11/1987 | Japan . |
| 62-269921 | 11/1987 | Japan . |
| 62-269936 | 11/1987 | Japan . |
| 62-269937 | 11/1987 | Japan . |
| 62-269938 | 11/1987 | Japan . |

(List continued on next page.)

OTHER PUBLICATIONS

French Search Report 91 14789.
French Search Report 91 14787.

*Primary Examiner*—Russell E. Adams
*Attorney, Agent, or Firm*—Sandler Greenblum & Bernstein

[57] ABSTRACT

An automatic focusing device, in which a focus lens is driven for tracking an object-in-motion so as to obtain an in-focus state, based upon a focus prediction that is executed from repeated distance measurements. Tracking is executed with different algorithms according to a moving direction of the object-in-motion. One algorithm is a catch-up tracking, wherein the focus lens is driven to a position where it is predicted that the in-focus state should be obtained at the time of completion of the lens drive. Another algorithm is a preemptive tracking, wherein the focus lens is driven to a position where it is predicted that the in-focus condition should be obtained at the time an exposure is actually executed after a completion of the lens drive.

32 Claims, 34 Drawing Sheets

U.S. PATENT DOCUMENTS

| | | |
|---|---|---|
| 5,005,039 | 4/1991 | Hamada et al. .................. 354/402 |
| 5,036,349 | 7/1991 | Suzuki et al. . |
| 5,060,002 | 10/1991 | Ohnuki et al. .................. 354/402 |
| 5,066,968 | 11/1991 | Suzuki et al. . |
| 5,089,843 | 2/1992 | Higashihara et al. . |
| 5,239,330 | 8/1993 | Uenaka . |

FOREIGN PATENT DOCUMENTS

| | | |
|---|---|---|
| 62-269939 | 11/1987 | Japan . |
| 62-269940 | 11/1987 | Japan . |
| 62-275208 | 11/1987 | Japan . |
| 63-2010 | 1/1988 | Japan . |
| 63-2012 | 1/1988 | Japan . |
| 63-2013 | 1/1988 | Japan . |
| 63-5316 | 1/1988 | Japan . |
| 63-100429 | 5/1988 | Japan . |
| 63-118133 | 5/1988 | Japan . |
| 63-144330 | 6/1988 | Japan . |
| 63-148218 | 6/1988 | Japan . |
| 63-223735 | 9/1988 | Japan . |
| 63-301929 | 12/1988 | Japan . |
| 2-181738 | 7/1990 | Japan . |
| 2224126 | 4/1990 | United Kingdom . |
| 2226467 | 6/1990 | United Kingdom . |

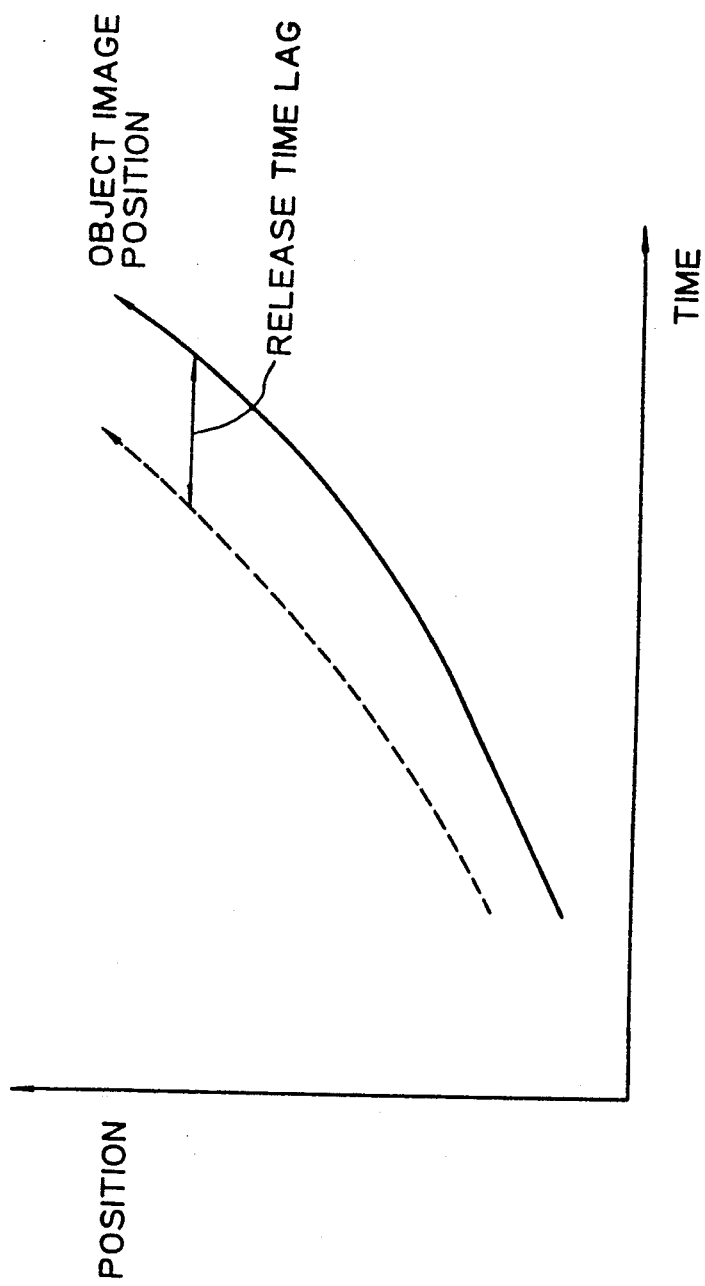

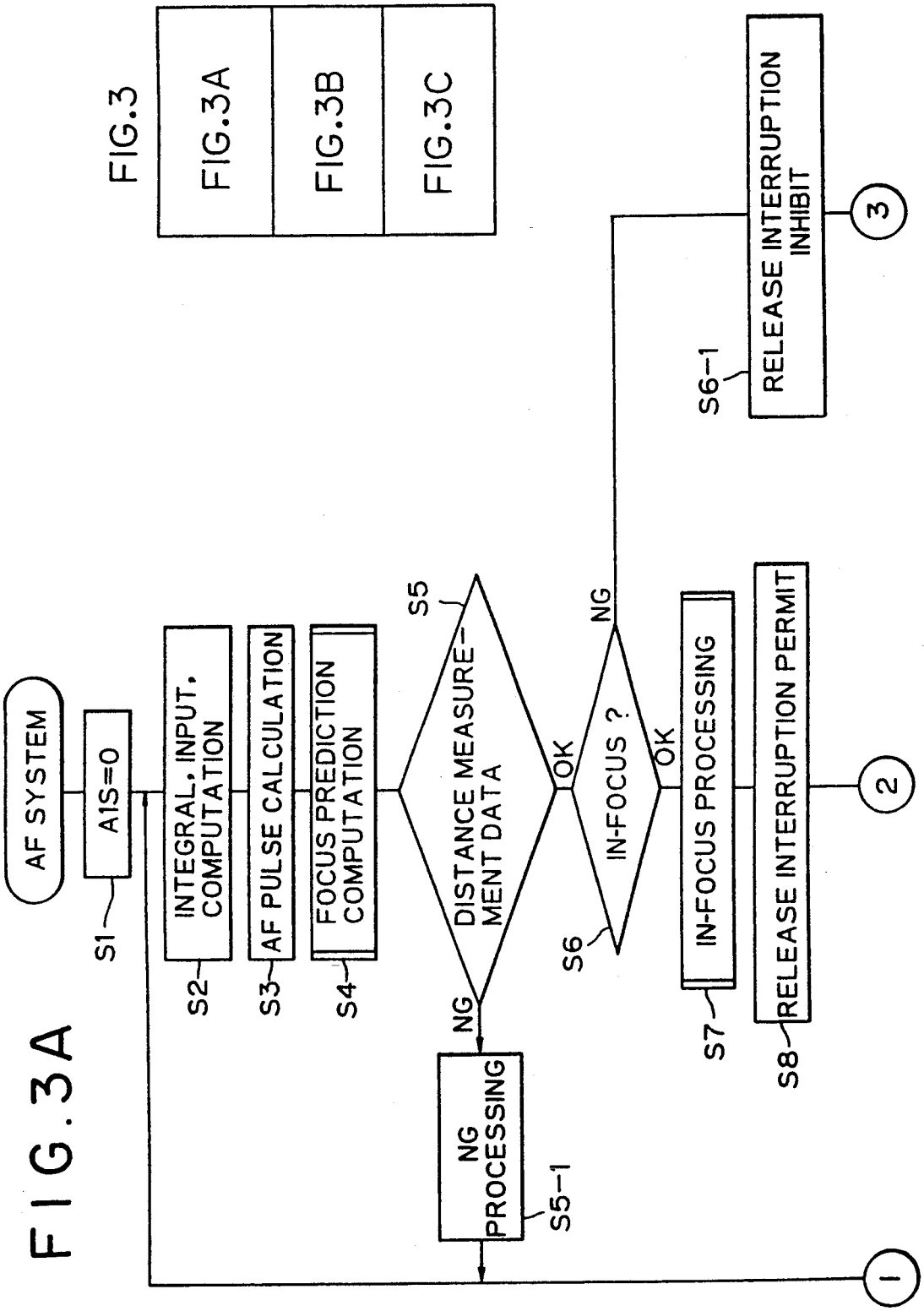

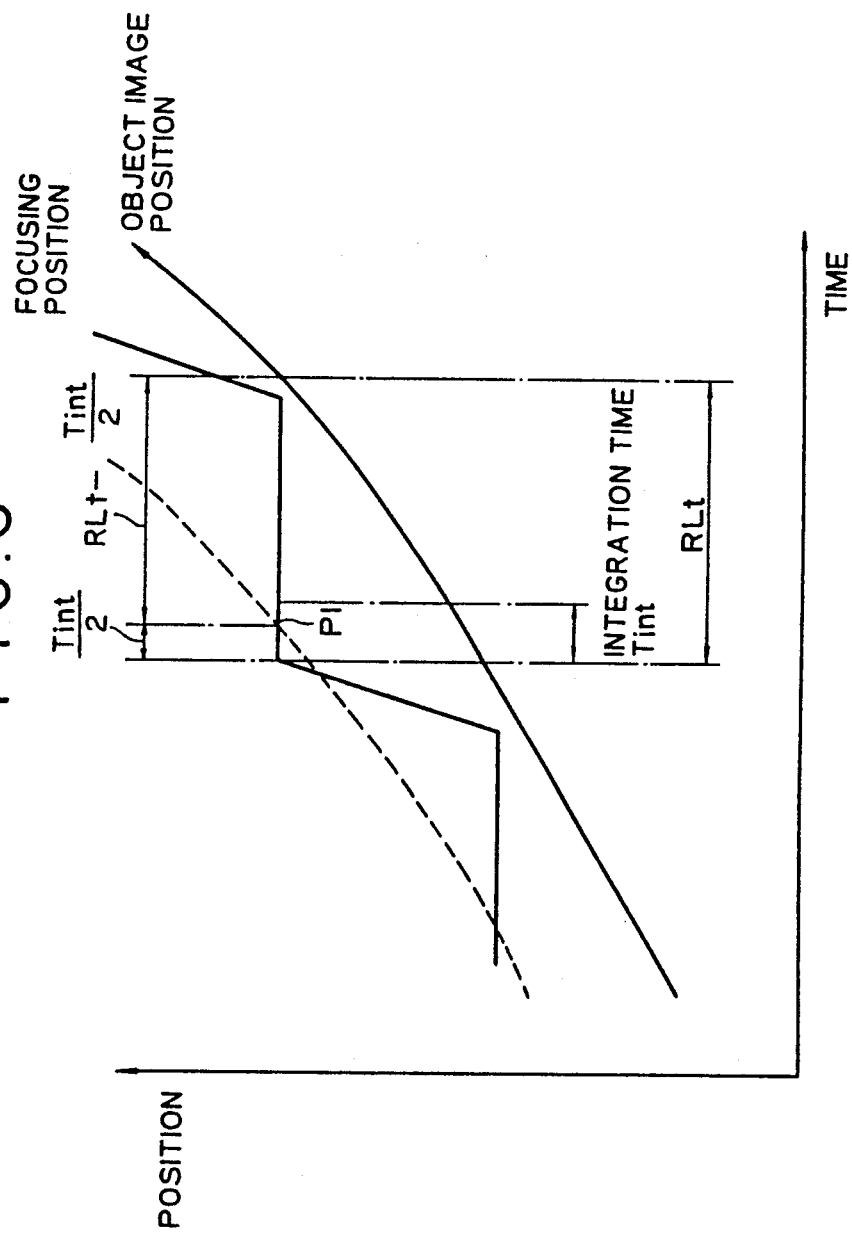

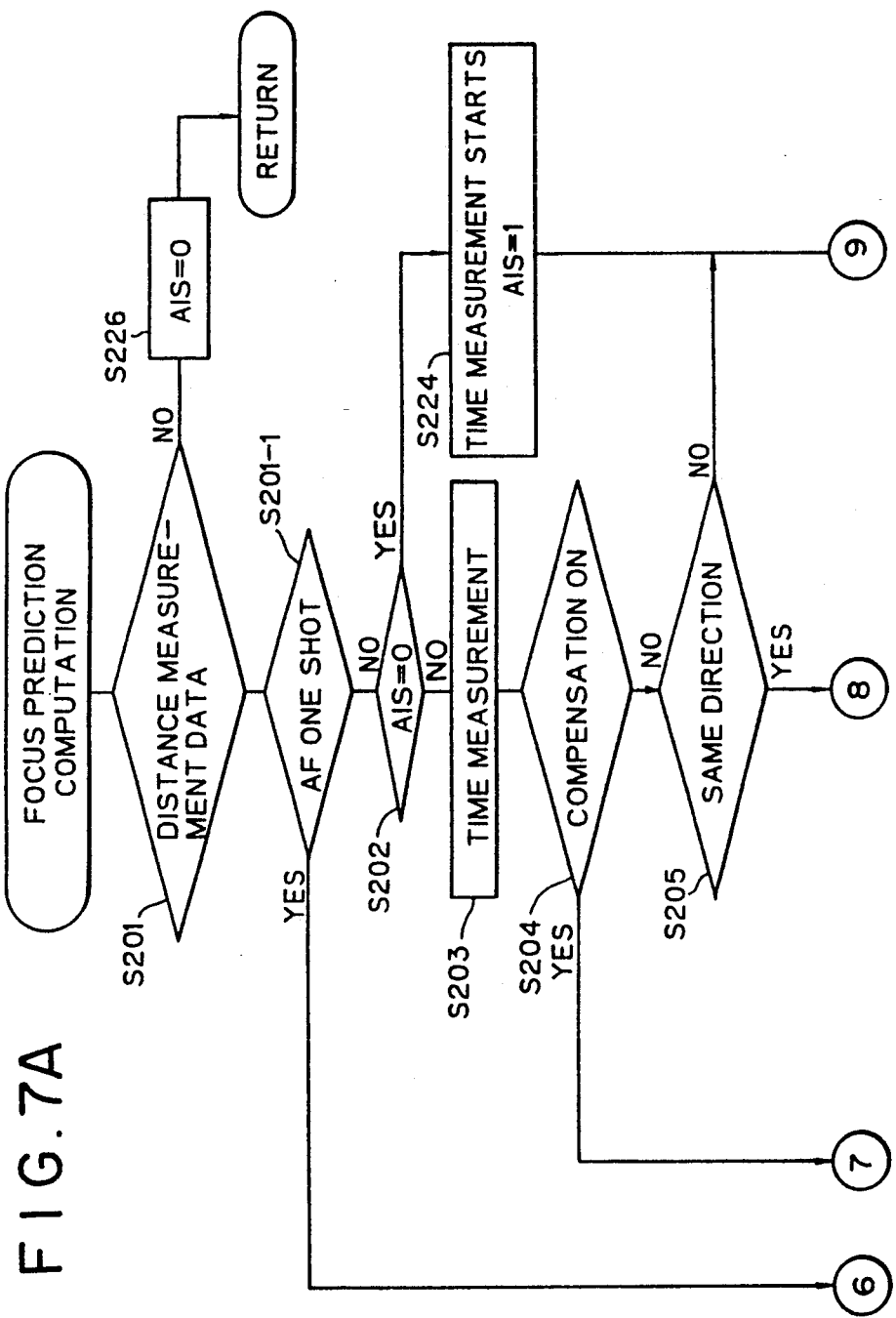

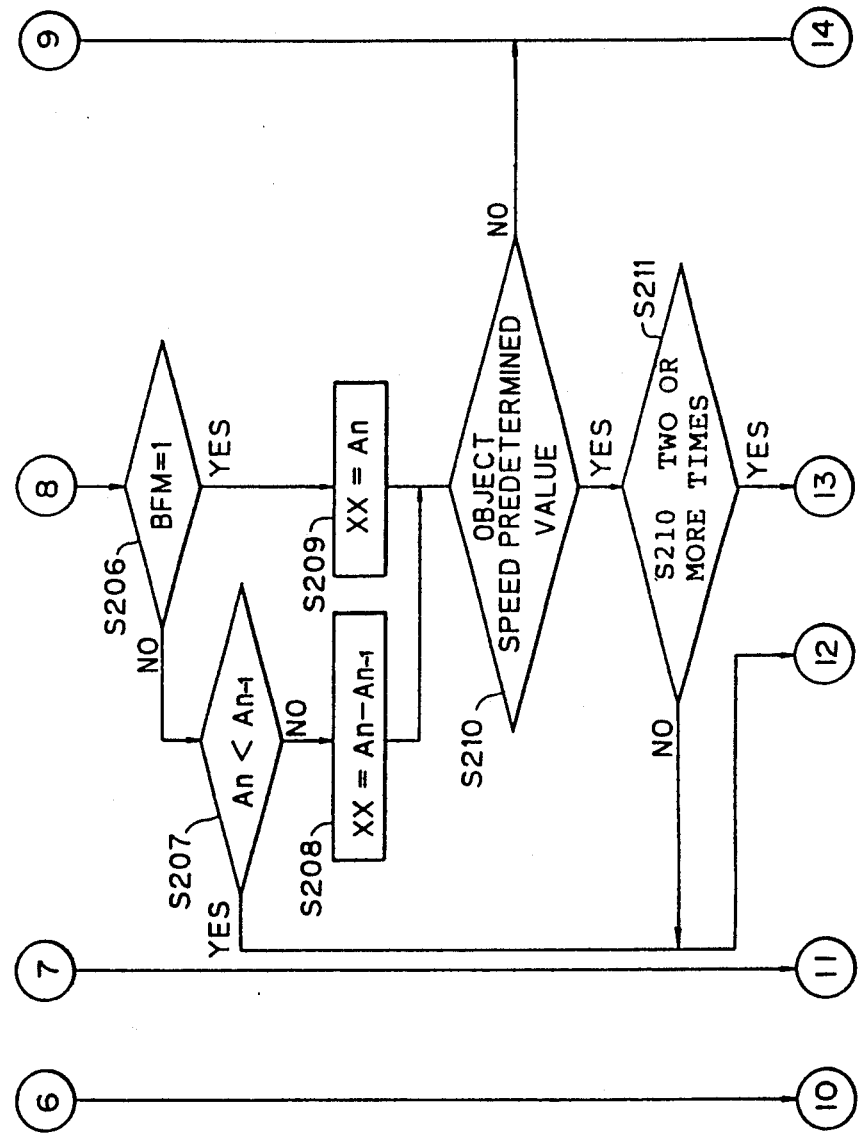

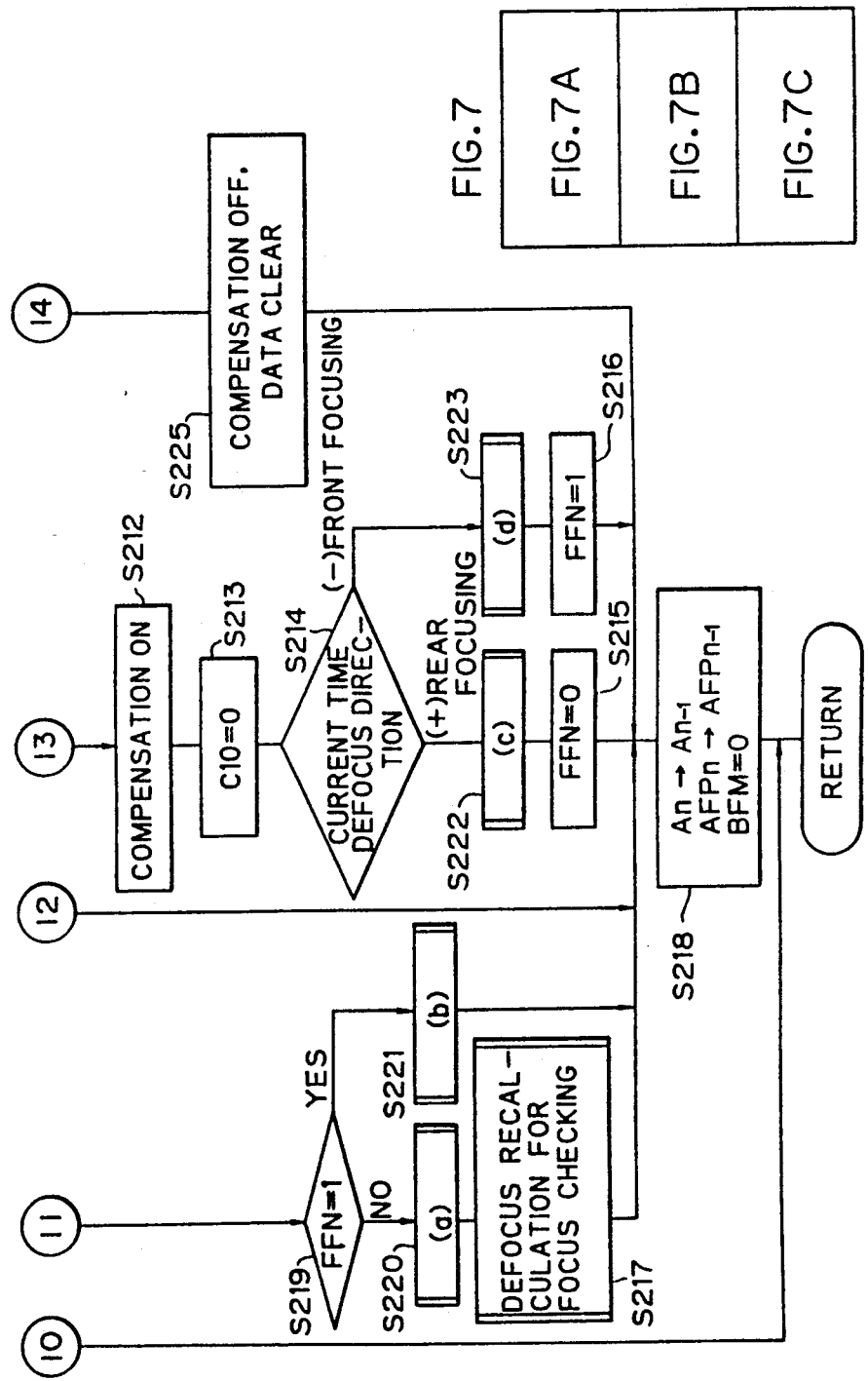

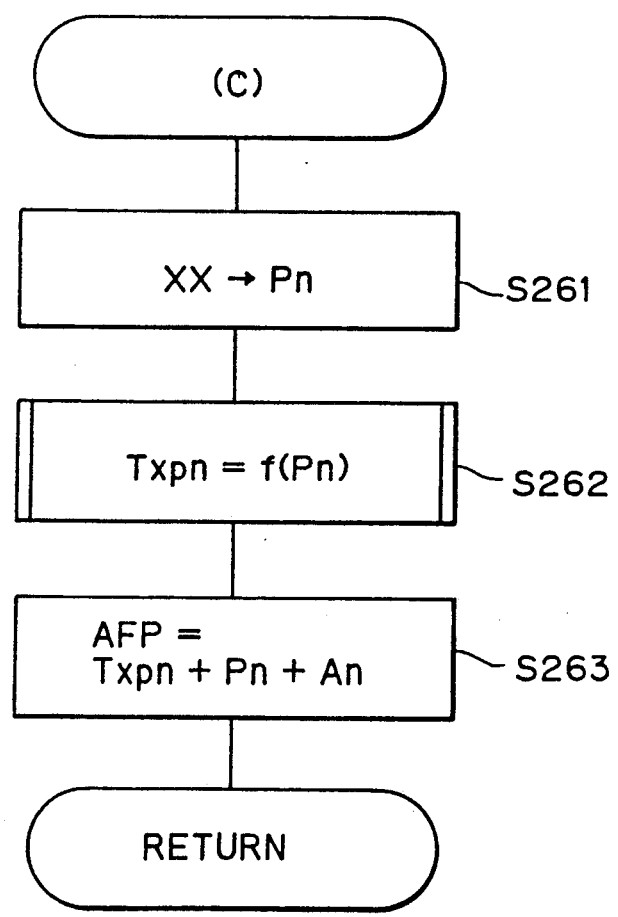

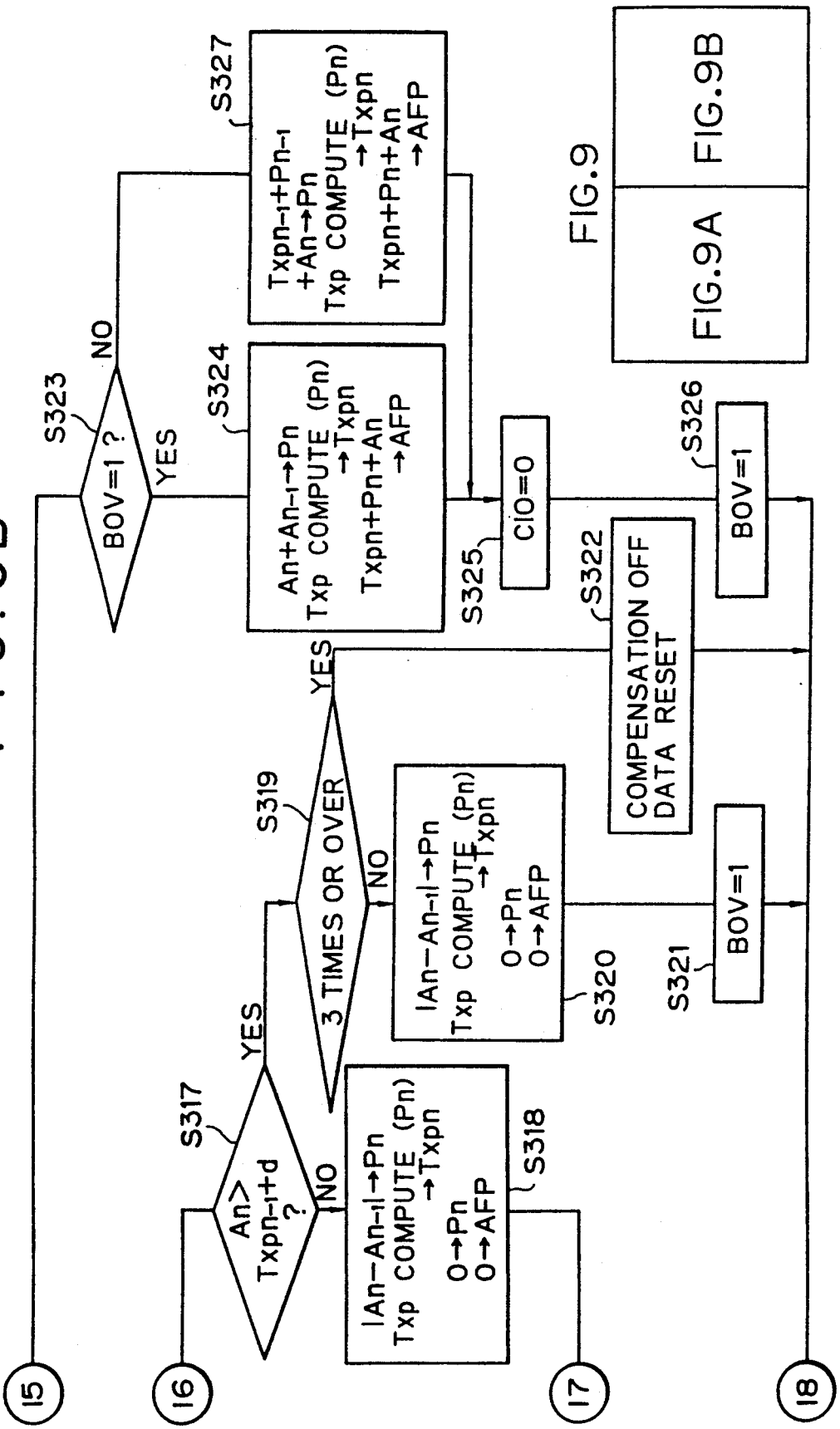

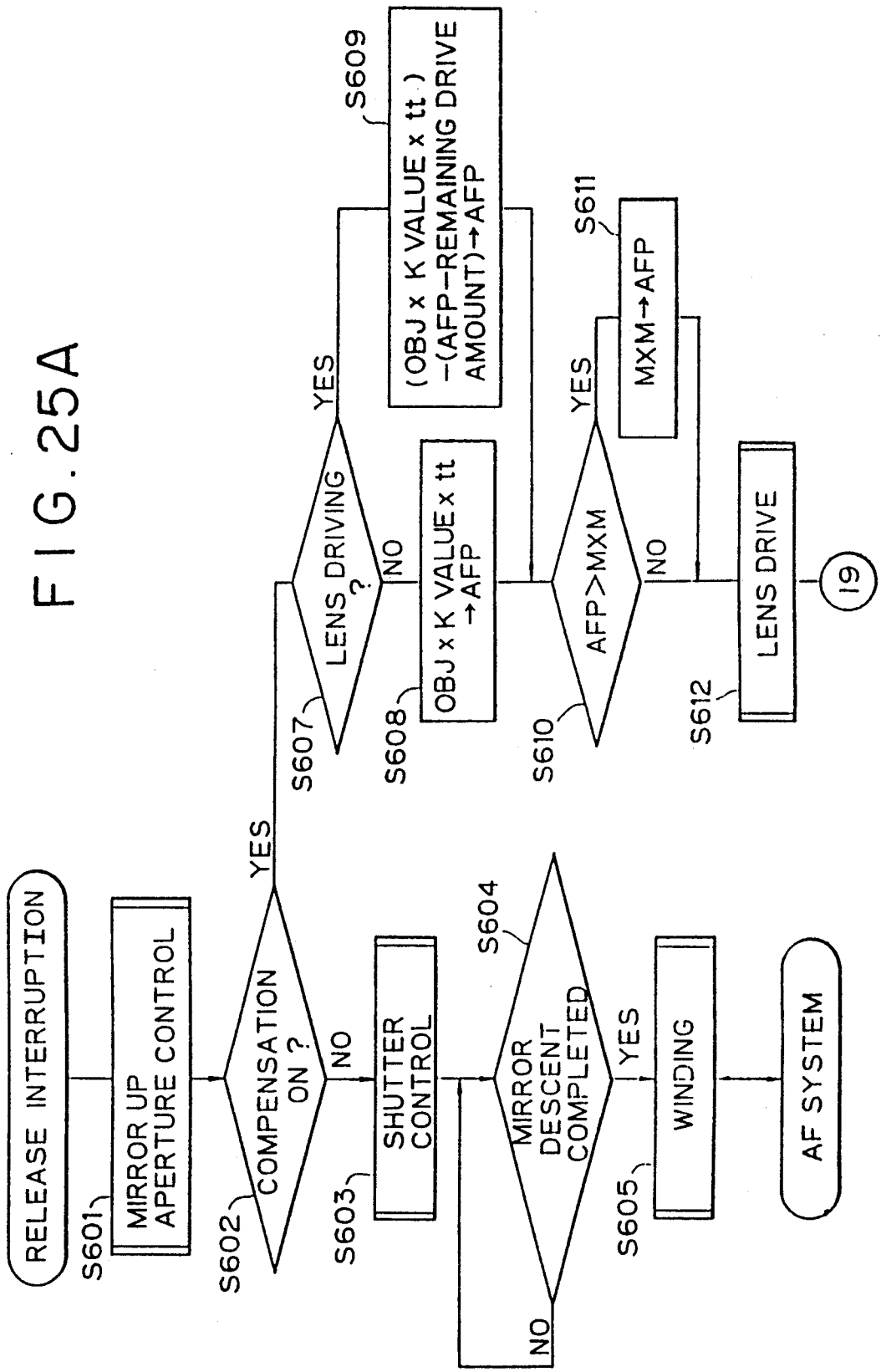

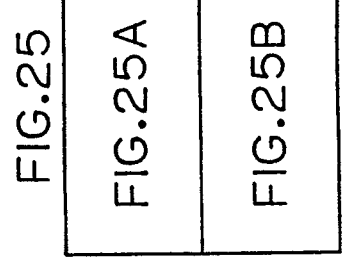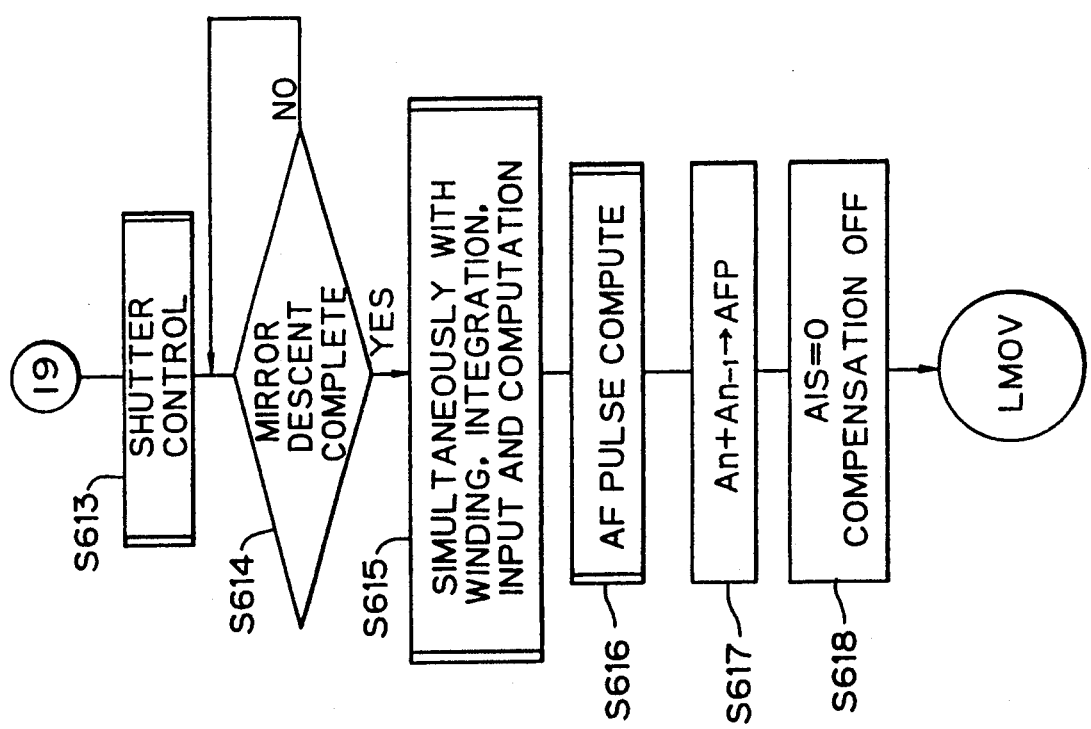

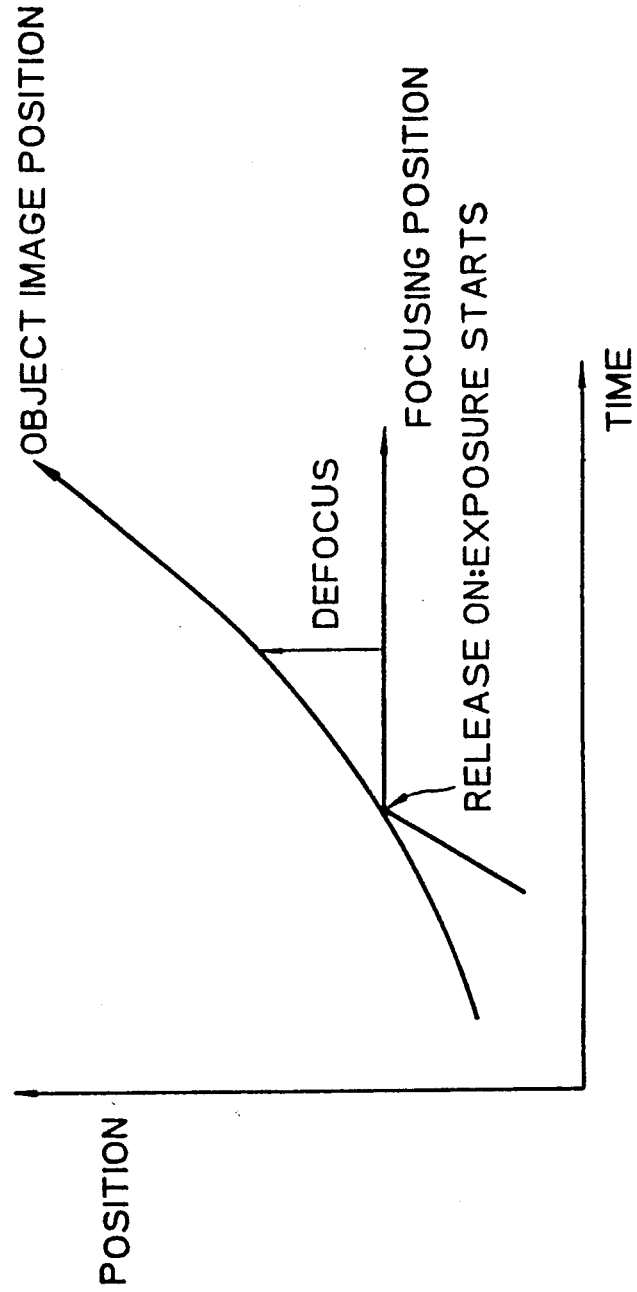

AUTOMATIC FOCUSING DEVICE

This application is a continuation of application No. 07/800,463, filed Nov. 29, 1991, now abandoned.

BACKGROUND OF THE INVENTION

The present invention relates to an automatic focusing device that is employed in, for example, a photographic camera.

In recent years, a camera equipped with an AF (automatic-focus) function is on the increase, and, on single lens reflex cameras with interchangeable lens as well, the AF function has become indispensable. In general, in single lens reflex cameras, a so-called phase difference detecting method is adopted for automatic focusing. The AF with the phase difference detecting method is executed with steps such as the following:

Firstly, a pair of object images with a spatial parallax are projected, respectively, on a pair of photosensitive units, such as a CCD (Charge coupled device), etc., and the light amount received by the respective photosensitive unit is integrated in terms of time. Then, according to the phase differential of two object images on respective photosensitive units, the distance differential between the sensing element (film equivalent plane) and the imaging plane (focus position) of the photographing lens with respect to a photographing object, and the direction thereof (defocus amount/defocus direction) are calculated.

From the calculated defocus amount and direction, drive amount of a motor necessary to drive the photographing lens to make the imaging plane coincident with the film equivalent plane is obtained, based upon which the focus lens is driven along the optical axis thereof. The number of pulses applied to the motor in the above operation is obtained according to the following formula:

$$P = Kv \times D$$

Where, P is the number of pulses applied to the motor,
D is the defocus amount, and
Kv is a so-called lens-movement-amount conversion coefficient (K value) which is a coefficient representing the relation between the defocus amount and the number of pulses to drive the motor as necessary to make the defocus amount zero, and is the value inherent to the respective lens.

FIGS. 30 through 32 explain a conventional AF system, as above described. In each drawing, "object image position" indicates the imaging plane of the photographing lens with respect to the photographing object with the position of the focus lens taken as a reference, and "focusing position" is the film equivalent plane, also with the position of the focus lens taken as a reference.

In FIG. 30, as a result of a distance measurement executed at time 0, assume that the distance differential between the focusing position and the object image position, i.e., the defocus amount is detected as D0. Then, to make the defocus amount D0 zero (0), the lens is driven. When the photographing object is stationary or standing-still, the focusing position becomes consistent with the object image position by the results of the driving of the lens. Under this state, interrupting processing of release ON is executed, and an exposure starts after elapse of a release-time-lag t2 which is the time required for mechanical operations for mirror ascent and stopping down of aperture. During exposure, as illustrated in FIG. 30, the focusing position and the object image position remain consistent with each other.

However, when the object is moving (more particularly, moving in the lens drive direction), even if integration and computation are once carried out during its movement, as the object keeps moving while the lens is being driven according to the results of such integration and computation, further integrations, computations and resulting lens drives must be repeatedly executed to keep the focusing position and the object image position consistent.

FIG. 31 shows the case wherein a photographing object is moving from a remote field to a near field at constant speed. The amount of movement of the object image position becomes larger as the object is closer to the photographing lens.

Assuming that distance differential between the object image position and the focusing position, i.e., the defocus amount, at point ① is D1. When the lens is driven by an amount corresponding to D1 and after elapse of time t1, defocus amount D2 is obtained at point ②. In the same manner, the lens is driven for the amount corresponding to D2, and after the elapse of time T2, defocus amount D3 is obtained at point ③. Here, the focusing position at point ② corresponds to the object image position at point ①, and since the object keeps moving while time T1 elapses, the defocus amounts would be, $$D1 < D2 < D3.$$

Thus, the defocus amount gradually increases each time when the distance measurement is executed, while the object is moving towards the photographing lens at a constant speed. Therefore, the lens drive can not sufficiently follow the movement of the object image position.

In order to overcome the above problem, the above delay should be prevented by predicting the amount of movement of the object image position from the start of integration to the completion of the computed lens drive, with which the lens is additionally driven. In this case, it is idealistic that the focusing position could be coincident with the object image position when the lens drive by the total amount is completed.

However, even though the idealistic prediction is done, and thereby, the focusing position becomes coincident with the object image position at the time of completion of the lens drive, the object image position may be out of the focusing position at the time when the exposure starts. That is, even if the release ON interruption processing is executed at the point where the focusing position coincides with the object image position, as illustrated in FIG. 32, a defocusing still occurs due to the release-time-lag previously mentioned.

Further, as in the case illustrated in FIG. 32, if the speed of movement of the object image position in the axial direction of the photographing lens (hereinafter called "object image speed") is accelerated, considerable a rear-focusing occurs. In general, comparing front-focusing and rear-focusing defocus amounts with respect to a film equivalent plane, defocusing of the rear-focusing with respect to the actual photographing object is larger than that of the front-focusing. Accordingly, rear-focusing should be avoided as much as possible. For this purpose, it is conceivable that the lens is driven in preemption of equivalence of the release-time-lag, as described above. However, if this preemptive drive is carried out indiscriminately, there would be the case, as the photographing object moves away from the camera, etc., that the object image position might not reach the predicted position after an elapse of the release-time-lag, resulting in a considerable rear-focusing.

SUMMARY OF THE INVENTION

It is therefore an object of the present invention to provide an improved automatic focusing device that is of executing an appropriate lens drive in accordance with objects moving at different accelerations and directions, so as to prevent a considerable rear-focusing, and to thereby, obtain a better focused photographs.

For the above purpose, according to the present invention, there is provided an automatic focusing device, comprising:

a focus lens that is movable along an optical axis thereof;

a drive means for driving the focus lens;

a distance measuring means for obtaining a defocus amount of the focus lens;

a computing means for computing a relative direction of movement of an object-in-motion with respect to said focus lens along said optical axis, based upon defocus amounts obtained by said distance measuring means; and a drive control means for controlling said drive means to drive said focus lens, based upon results of a computation by said computing means, to a position where an in-focus condition is obtained with respect to said object-in-motion after an elapse of a predetermined time, wherein said drive control means determines a drive amount of said focus lens with different algorithms in accordance using said direction relative of movement of said object-in-motion.

DESCRIPTIONS OF ACCOMPANYING DRAWINGS

FIG. 2 is a graph explaining a fundamental principle of a focus prediction system;

FIG. 3 and FIGS. 3A, 3B and 3C are a flow chart showing a processing of an AF system with the focus prediction system;

FIG. 6 is a graph explaining a principle of focus prediction computation for an object-in-motion with an integration time taken into consideration;

FIG. 7 and FIGS. 7A, 7B and 7C are a main flow chart of a focus prediction computation;

FIG. 8 is a flow chart for the focus prediction computation, in the case where the object-in-motion is approaching to the camera, executed immediately after a compensation is turned ON;

FIG. 9 and FIGS. 9A and 9B are a flow chart for a computation, in the case where the object-in-motion is approaching to the camera, for a second time and so on after the compensation is turned ON;

FIG. 19 is a flow chart explaining a computation for the case where the object-in-motion moves away from the camera after the compensation is turned ON;

FIG. 20 is a flow chart explaining the computation for the case where the object-in-motion moves away from the camera, for a second time and so on after the compensation is turned ON;

FIG. 25 and FIGS. 25A and 25B are a flow chart for the processing in the case where the distance measurement is executed immediately after a mirror descent under a continuous-shot mode, and that further lens drive is executed after a release processing;

FIGS. 30, 31 and 32 are graphs explaining conventional AF systems.

DESCRIPTIONS OF EMBODIMENTS

Hereinafter, a preferred embodiment of the present invention is described with reference to the drawings.

Figure 1:
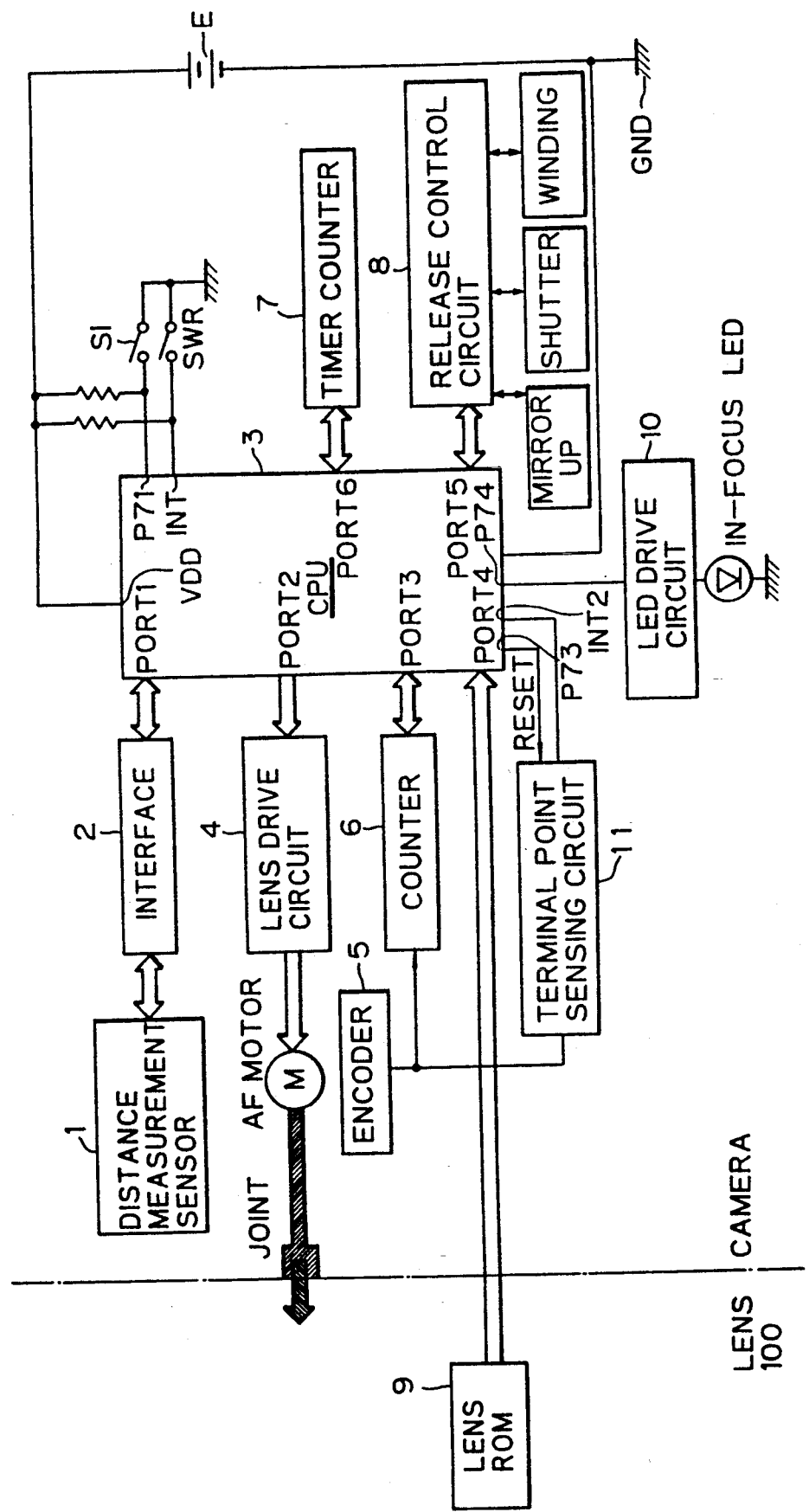
FIG. 1 is a block diagram showing principal parts of an automatic focusing device, embodying the invention, employed in a photographic camera.

FIG. 1 is a block diagram showing principal parts of a single lens reflex camera employing an automatic focus device embodying the invention.

In the illustrated camera, when an AF switch S1 is closed, the potential of port P71 of CPU (central processing unit) 3 becomes LOW, with which operation of an AF system starts.

First, a distance measurement sensor 1, which comprises a CCD (charge coupled device) and so on, performs a distance measurement. The obtained distance measurement data is transmitted to port 1 of CPU 3 via an interface 2, with which the defocus amount and direction thereof are computed by the CPU 3. Next, a lens drive amount required to bring a lens 100 to an in-focus condition is computed from a K-value stored in a lens ROM (read only memory) 9 and the computed defocus amount.

In case the defocus amount is not obtained, etc. it is determined whether the distance measurement data is effective. If the data is found to be ineffective, a NG processing that indicates that the distance measurement has not appropriately been done is executed. Then, the distance measurement is repeated.

Next, it is determined whether the defocus amount obtained falls within a predetermined focus allowance, and if it does, an LED (light emitting diode) drive circuit 10, which is controlled through port 74 of the CPU 3, turns on an in-focus LED (not numbered), and an interruption for a release-ON process is permitted.

When the obtained defocus amount is out of the predetermined focus allowance, the interruption for the release-ON processing is inhibited, a lens drive amount is set in a counter 6, and a lens drive circuit 4 is controlled to start a lens driving. The number of revolutions of an AF motor driven by the lens drive circuit 4 is monitored by an encoder 5 to decrement the value of the counter 6 until it becomes zero (0), Where the AF motor is stopped, and the lens drive is discontinued.

In the release-ON interruption processing, a series of release control processings, such as mirror ascent, exposure, and mirror descent, are executed by a release control circuit 8 via port 5 of the CPU 3 when a release switch SWR is closed.

It is not at the moment when the release switch SWR is closed that a shutter is open. There is a time lag between the closure of the release switch SWR and the start of exposure with the opening of the shutter, which is called as "release-time-lag". That is, before opening the shutter, it takes time to stop down an aperture based upon an aperture value that is set in advance, either manually or by an exposure control computation, and to ascent a reflecting mirror.

In case an photographing object is stationary or standing-still, the position of the object relative to the photographing lens does not change during the release-time-lag. Accordingly, once the photographing lens is driven to an in-focus position with respect to the object, further defocusing does not occur, and therefore, an exposure can be done under the in-focus condition regardless, of the length of the release-time-lag.

However, in the case where a photographing object is moving in the optical axis of the photographing lens (hereinafter called "object-in-motion"), as the position of the object relative to the photographing lens changes during the release-time-lag, even if the photographing lens is under the in-focus condition with respect to an object at the time when the release switch SWR is closed, the object may have moved to an out-of-focus position at the time when the exposure starts.

In this embodiment, in order to make the object image position coincident with the focusing position at the time when the exposure is performed (i.e., after the release-time-lag has elapsed), the focus prediction is executed, which will be hereinafter be explained in detail.

In FIG. 2, a solid curved line shows movement of the object image position. If the lens drive is controlled such that the focusing position comes on the solid line after elapse of the release-time-lag, the exposure can be performed under the in-focus condition.

A dotted curved line in FIG. 2 represents changing of the object image position shifted to the left side in parallel by an amount equivalent to the release-time-lag. If the lens is driven to make the focusing position follow this dotted curved line, the exposure can always start with the focusing position being coincident with the object image position, i.e., under the in-focus condition, whenever the release switch SWR is closed.

Figure 3B:
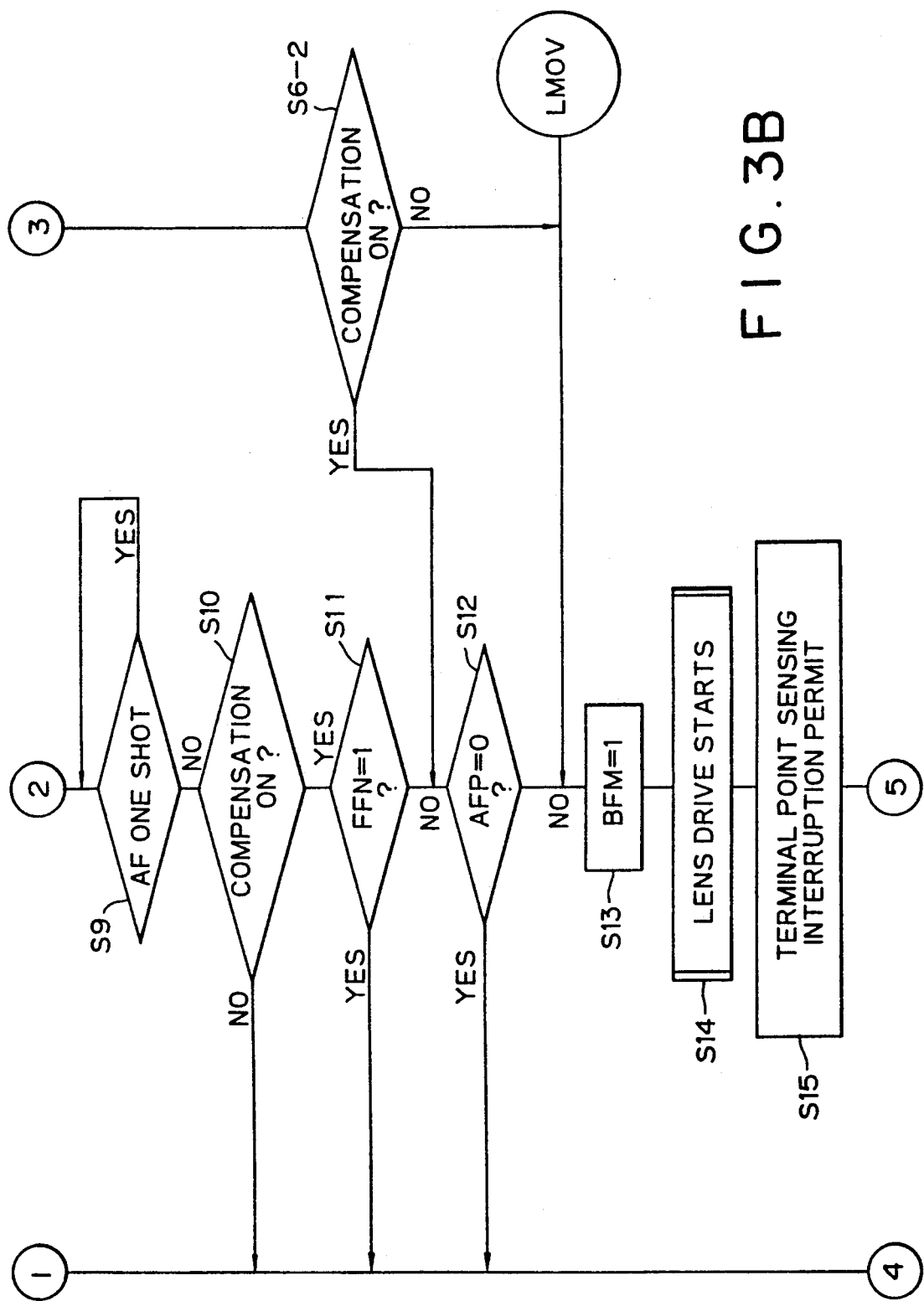
Figure 3C:
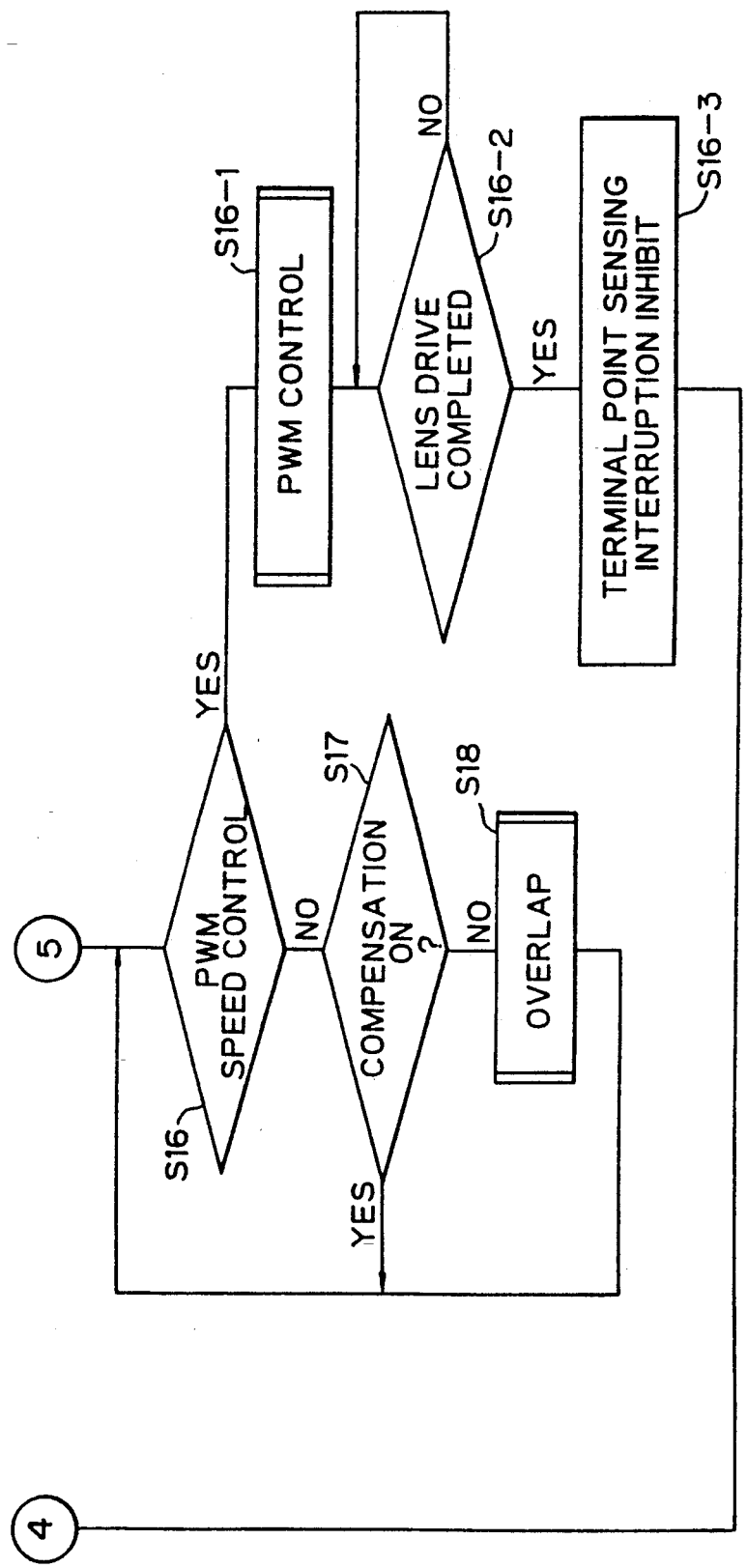

FIG. 3 is a flow chart showing a main processing of the AF system employed in this embodiment. As, in this flow chart, the processing sequence is changed according to the times of the AF distance measurements, flag AIS, showing the times of the AF distance measurements is cleared in step S1.

In step S2, the distance measurement data is obtained by distance measurement sensor 1 and a defocus amount is computed therefrom. Then, in step S3, a lens drive amount (i.e., AF pulse numbers) is computed and set in counter 6, as previously mentioned.

In step S4, a focus prediction computation, which will be described later in detail, is carried out.

Next, in step S5, it is determined whether the distance measurement data is effective. If it is not effective, an NG processing such as indicating that the distance measurement has not been properly executed, is performed in step S5-1, and processing returns to step S2, where the distance measurement is repeated.

It is determined in step S6 whether the defocus amount falls within a predetermined focus allowance. If it does, an in-focus processing, such as lighting an in-focus LED, is carried out at step S7, and interruption for release-ON processing is permitted.

In step S9, it is discriminated whether a so-called AF-one-shot mode is selected. If it is, AF processing is suspended, as in-focus condition has once been obtained, for waiting the closure of the release switch SWR.

Next, it is discriminated in step S10 whether compensation is ON, that is, whether it is in the focus prediction mode. If not, processing returns to step S2 to repeat the above explained steps. Further, it is discriminated in step S11 whether the photographing object is approaching lens 100 or moving away from a lens 100, according to a flag FFN. When the photographing object moves away from lens 100 (in this case, FFN=1), processing also returns to step S2.

When in the focus prediction mode and the object is approaching the lens 100, it is then discriminated in step S12 whether the lens drive pulse number (AFP) of the current time is zero (0). If it is, processing returns to step S2, while a lens drive flag BFM is set to 1 if the lens drive pulse number is other than zero (0). The BFM flag indicates whether the lens has been driven.

In case it is found in step S6 that the photographing 15 object is not in a focusable area, (that is, the defocus amount does not fall within the predetermined focus allowance), interruption for release-ON processing is inhibited in step S6-1, and it is determined whether compensation is ON, i.e., whether the focus prediction mode is employed, in step S6-2. When it is found to be ON, it is determined in step S12 whether the lens drive pulse number AFP is zero (0). When it is found that AFP=0, processing returns to the distance measurement processing of step S2.

When the AFP is other than 0, and therefore, the lens should be driven, or when it is found in the step S6-2 that the focus prediction mode is not employed, processing advances to step S13, where lens drive flag BFM is set to 1. Then, a series of instructions, beginning with step S14 for a lens drive processing are executed.

In the lens drive processing, firstly, in step S14, the lens drive amount is set to counter 6 and lens drive circuit 4 is controlled to initiate the lens drive. The number of revolutions of the AF motor run by the lens drive circuit 4 is monitored by encoder 5 to decrement value in the counter 6. When the value in counter 6 becomes zero (0), the AF motor is stopped and the lens drive is discontinued.

After the lens drive has thus started, interruption for the processing to be executed at the time when the lens reaches a terminal point of the drive range thereof, is permitted at step S15. Such interruption processing will be described later in detail.

In the step S16, it is determined whether a PWM (pulse width modulation) control on the AF motor is necessary, based upon the remaining pulse number in counter 6. The PWM control is to control the AF motor so that the lens drive speed decreases step by step immediately before completion of the lens drive in order to accurately stop the lens at the position where the value of counter 6 becomes zero (0): i.e., at the in-focus position.

If the PWM control is unnecessary that is, the lens is on the way of driving, it is determined at stop S17 whether compensation is ON. When compensation is not ON, an overlap processing, for repeating the distance measurement and computation during the lens drive, is executed at step S18 for renewing the value in counter 6. Then, processing returns to step 16 to repeat the determination of whether the motor PWM control has become necessary. If the compensation is ON, however, the processing returns to step S16 without executing the overlap processing. The relationship between the compensation ON and the overlap processing will be described later.

When it is determined at step 16 that the PWM control has become necessary, that is, when it is immediately before the completion of the lens drive, the PWM control is executed in step S16-1, and it is determined at step S16-2 whether the lens drive is completed.

Upon completion of the lens drive, interruption for processing to be executed when the lens reaches the terminal point is inhibited, at step 16-3, and the processing returns to step S2 for repeating the distance measurement and succeeding instructions.

Hereinafter, the focus prediction mode employed at the time of compensation ON is explained in detail.

In the focus prediction mode of this embodiment, the lens is driven according to two different algorithms, one of which is selectively adopted depending upon the case. One is a "catch-up tracking" mode and the other is a "preemptive tracking" mode. Under the preemptive tracking mode, the release-time- lag is taken into account, while it is not taken into account under the catch-up tracking mode.

First, referring to FIG. 4, the AF motor drive pulse number obtained at point ① is taken as A1 (Since the defocus amount on the film equivalent plane can be converted, by multiplying it by the K-value, to the pulse number applied to the AF motor for driving the lens 100 to the in-focus position, in the descriptions hereinafter, the pulse number applied to the AF motor to eliminate the defocus amount is called simply "pulse number" or "lens drive amount").

After pulse A1 is applied to the AF motor for lens drive, and after elapse of time t1, assume that the pulse number A2 is obtained at point ②. The amount of movement of the object image position from point ① to point ② corresponds to pulse number A2. Accordingly, between points ① and ②, an object image speed OBJsp is obtained by:

$$OBJsp = A2/t1.$$

Here, the object image position at point ③ after elapse of time t2 from point ② can be expressed, if the object image speed is constant by:

$$A2 + t2 \times OBJsp.$$

With the amount of movement of the object image position during time t2 being taken as P2, if a substitution is made with $$P2 = t2 \times OBJsp,$$

then, the drive amount can be expressed as:

$$A2 + P2.$$

That is, the position to which the lens is driven by the AF motor by the drive amount of A2+P2 is the object image position after elapse of time t2.

In the meantime, the above P2 must have been obtained before the lens drive amount is computed. Here, after the distance measurement data has been obtained, the time required for computation of the lens drive amount is constant and, therefor, the total time including the lens driving time can be considered to be not so much different in respective cases. Hence, on the assumption that the computation time and the driving time of the current time, that is the, time t2, is same as that of the previous time, i.e., time t1, time t2 can be obtained by actually measuring time t1, with which P2 is computed.

The above explained computation is for the catch- up tracking.

Figure 4:
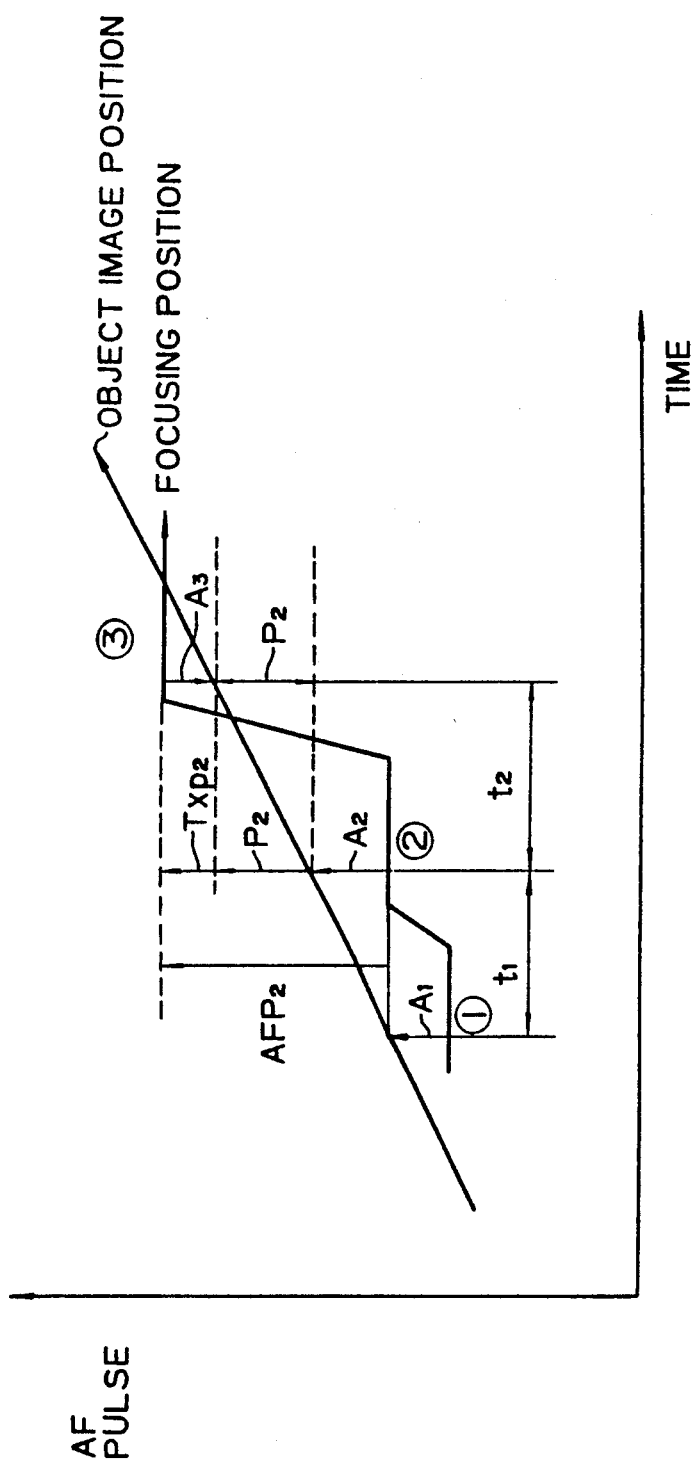
FIG. 4 is a graph explaining principles of a catch-up tracking mode and preemptive tracking mode of the focus prediction system.

However, as seen in FIG. 4, even if, at point ②, the AF motor is driven by the amount of A2+P2 to make the focusing position and the object image position coincident and the release switch SWR is closed at point ③, it is after the release-time-lag has elapsed that are exposed actually starts. Accordingly, further defocusing occurs at the time the exposure starts, and it is necessary to drive the lens in a further preemption equivalent to the amount of movement of the object image position during the release-time-lag. This is the preemptive tracking which will be described hereinafter in detail.

If the release-time-lag is taken as RLt, a forestalled pulse number TXP2 required to additionally drive the lens to move the object image position to the position where it becomes consistent with the focusing position at the time of elapse of the release-time-lag, is obtained by:

$$TXP2 = RLt \times OBJsp.$$

Here, as shown in FIG. 6, the integration is carried out for the interval of time Tint in order to measure the defocus amount, and various data are obtained from the result of this integration. However, the point where the defocus amount is obtained is not the starting point of the integration, but is considered at point Pi shifted by Tint/2 therefrom (i.e., the middle point of the integration time). So, if the lens drive amount is computed by taking this into account, i.e., if the release-time-lag used in the computation is calculated as:

$$RLt - Tint/2,$$

more accurate focus prediction can be done.

Accordingly, in the computation formula of the above-mentioned TXP2, the compensation should be done like:

$$TXP2 = (RLt - Tint/2) \times OBJsp.$$

Then, by setting the lens movement amount AFP2 to:

AFP2=A2+P2+Txp2, the lens drive under the preemptive tracking mode will be executed.

Here, if the drive pulse number A3 actually obtained at point ③ coincides with the computed Txp2, it means that the preemptive tracking has been successfully done. (In actual operation, since the object image speed is not always constant, A3=Txp2 does not necessarily stand.)

Figure 5:
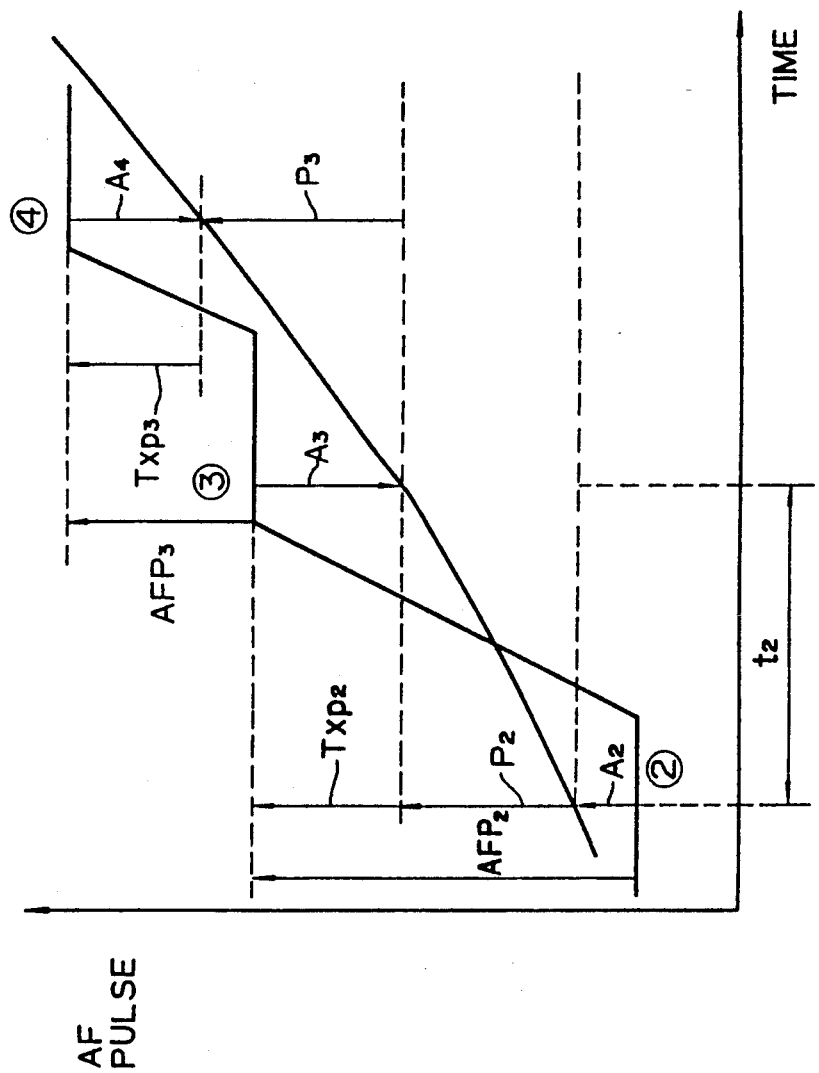
FIG. 5 is a graph explaining a computation under the preemptive tracking mode.

Next, in FIG. 5, assume that the drive pulse number A3 is obtained at point ③ as the result of, integration and computation. Then, as mentioned previously mentioned the time passing from point ③ to point ④ can be considered the same as time t2, and the object image position moves between points ③ and ④ by an amount equivalent to that between points ② and ③, in case the object speed is constant.

Accordingly, P3, the amount of movement of the object image position between points ③ and ④ can be obtained by:

P3=P2+Txp2−A3.

Therefore, AFP3, the lens drive amount from point ③ to point ④ is:

AFP3=P3+Txp3−A3.

The above can be applied to the movement of the object image position between points n-1 and n. Thus, the following general formulas are obtained:

Pn=Pn-1+(Txpn-1−An)

Txpn=f(Pn)

AFPn=Txpn+Pn−An,

Thus, Txpn can be obtained as a function of the object image movement amount Pn, i.e., f(Pn). Txp in principle can be obtained according to:

Txp=(Pn/t)×RLt.

However, as explained above, the release-time-lag used in the computation should be calculated as:

RLt−Tint/2, in order to execute a more accurate focus prediction.

Accordingly, a general computation formula of the above-mentioned TXP should be:

Txp=(Pn/t)×(RLt−Tint/2).

Txp is obtained from the distance measurement data and is greatly affected by dispersion of the distance measurement data, so that in this embodiment, the data obtained in the four times in past immediately before executing the computation are averaged according to the following formula:

Txpn=(Txp+Txpn-1+Txpn-2+Txpn-3)/4

In case there is the item to which no past data is available, zero (0) is substituted in the computation in order to restrict the Txpn value small.

FIG. 7 is a flow chart of a subroutine for a "focus prediction" carried out in step S4 of FIG. 3.

In step S201, the distance measurement data is checked. If the data is found to be ineffective, distance measurement times counter flag AIS is reset to 0 at step S226, and processing returns to the main routine. The cases where such situations occur are, for instance, whereby the object is extremely weak in contrast, or the defocusing is so large that no distance measurement data is obtained.

Even if the distance measurement data is effective, if the AF one-shot mode is selected, that is, in case the focus processing is inhibited once the in-focus condition is obtained, as it is unnecessary to enter into the focus prediction mode, processing returns to the main routine (step S201-1).

Further, even if the AF one-shot mode is not selected, when processing comes to this routine the first time (i.e., AIS =0), processing returns to the main routine through steps S224, S225 and S218. At step S224, counting flag AIS is set to 1 to indicate that the processing has come to this routine at least one time, and timer 7 starts measuring the time interval between successive distance measurements. Then, data employed in the computation are cleared at step S225.

When the number of distance measurements is more than one (1), i.e., the second time and on, processing advances from step S202 to step S203. In step S203 the time interval from the previous distance measurement is obtained by timer 7. Then, at step S204, it is discriminated whether compensation is ON, i.e., whether the focus prediction mode is employed. As compensation is not ON under the initial state, i.e., the focus prediction mode is not employed, processing advances to step S205. In steps S205 through S211, it is determined whether the photographing object is to be treated as the object-in-motion.

At step S205, the defocus directions of the previous time and the current time are compared. If they are found to be different, it is considered that the photographing object has changed it's direction of movement, and therefore, processing returns, without determining whether the object is to be treated as the object-in-motion, to the main routine through steps S205 and S218. If the defocus directions are the same, it can be regarded as the photographing object continues movement in the same direction, and processing advances to step S206.

At step S206, it is determined according to flag BFM, whether the lens drive has previously been carried out. In the case where the lens drive was carried out in the previous distance measurement cycle, that is in the case where BFM=1, processing advances to step S209, where the object image movement amount XX of the current cycle is set to An. In the case where the lens drive was not carried out in the previous cycle, that is, in the case where BFM=0, the processing goes to step S207, where the previous time defocus amount An-1 and the current time defocus amount An are compared to determine whether the object image position is approaching the focusing position.

In the case where the object image position is approaching the focusing position (in the case where An-<An-1), the in-focus state will be obtained without employing the focus prediction mode, so that processing returns to the main routine through step S218.

On the other hand, at step S207, in the case where the object image position is found to be moving away from the focusing position, or in the case where it is found to be at an equal distance (no distance change, in case other than An<An-1), the previous time defocus amount An-1 is subtracted from the current defocus amount An in step S208, and the current object image movement amount is defined as XX=An−An-1.

Then, at step S210, the object image speed OBJsp during one distance measurement cycle from time t, that is, $$XX/(Kvalue \times t)$$

is checked to determine whether it is larger than a predetermined value. Here, the predetermined value corresponds, for example, to the speed at which the amount of movement of the object image position, during the period of the sum of the interval between the successive distance measurements plus the release-time-lag RLT, coincides with the predetermined focus allowance, which is expressed by the formula:

$$Focus\ Allowance/(t+RLt).$$

In other words, where the object image speed OBJsp is smaller than the predetermined value, if interruption for release-ON processing is executed after the lens is driven based on the distance measurement of the current time, the object image position will remain within the focus allowance at the time of the exposure start after elapse of the release-time-lag. Thus, the focus prediction is not required.

Meanwhile, the above-mentioned predetermined value may be set to a smaller value, in order to make a definite identification of the object-in-motion. Further, although the determination may become more or less rough, the predetermined value may be set to correspond to the speed at which the amount of movement of the object image position during the release-time-lag coincides with the focus allowance.

As above, when the object speed OBJsp is smaller than the predetermined value, processing returns to the main routine through steps S225 and S218.

On the contrary, in the case where the object image speed OBJsp is larger than the predetermined value, it is determined at step S211 whether the above-mentioned speed judgment has been executed for the first time, and if so, processing returns to the main routine through step S218.

If the object image speed OBJsp is determined to be larger than the predetermined value, in the second or succeeding computation cycle, the compensation is set to ON for the first time, and the lens drive according to the focus prediction mode is employed.

In the steps S212 and S213, respectively, compensation ON and flag C10=0 (meaning that this is the first cycle after compensation ON stands. For the second cycle and on, C10=1) are set. In step S214, the defocus direction of the current time is determined, based on the direction of movement of the object image position. In other words, in the case of a rear-focusing (+), it is determined that the photographing object is approaching the camera, and in the step S222, the preemptive tracking starts. On the,. other hand, in the case of a the front-focusing (−), the object is moving away from the camera, and in step S223, the catch-up tracking starts.

In S215, flag FFN representing a relative positional relationship between the object-in-motion and the camera, is set to 0 to indicate that the object is approaching to the camera. On the other hand, in S216, flag FNN is set to 1 to indicate that the object is moving away from the camera. Subsequently, processing returns to the main routine through step S218.

Figure 23:
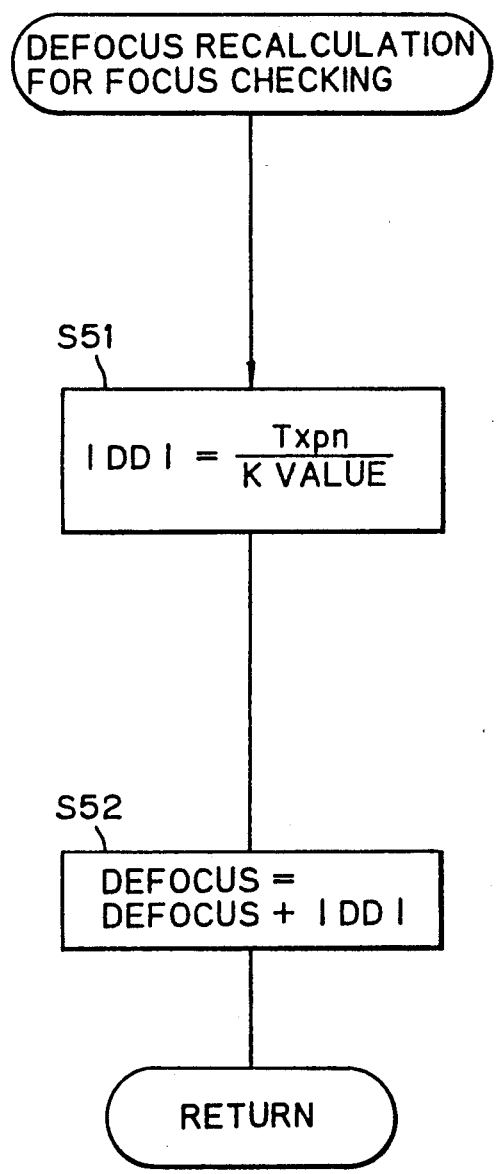
FIG. 23 is a flow chart showing a defocus amount recomputation subroutine for checking whether the position where the lens has been driven, based upon the focus prediction computation, is the focusing position.

When the routine comes to the present routine after the compensation ON has come to stand, processing diverges to step S219 from step S204, and in the case where the object is approaching to the camera, the processing of step S220 is executed, and the defocus amount is recomputed in step S217 according to the routine of FIG. 23. In the case where the object is moving away from the camera, the processing of step S221 is carried out and processing returns to the main routine via step S218.

In step S218, to facilitate the next computation, AN, and AFPn are set as An-1 and AFPn-1, respectively and saved, and flag BFM is reset to 0.

FIG. 8 is a subroutine executed at step S222, for the case wherein processing is shifted from the catch-up tracking mode to the preemptive tracking mode.

XX is the object movement amount (pulse number) which is set to Pn to be used for the computation of this time (Step S261). As previously described, as a function of the object movement amount Pn, the drive amount equivalent to the release-time-lag Txpn is calculated (Step S262). Then, the lens drive amount AFP of this time (the drive amount to shift from the catch-up tracking mode to the preemptive tracking mode) is calculated at step S263, as already described in the explanation for the fundamental calculations.

In the focus prediction computation, in the second time after compensation ON stands and afterwards, on the basis of the value of FFN set during steps of S215 and S216 FIG. 7, the processing executed is differentiated according to the movement direction of the photographing object.

Figure 9A:
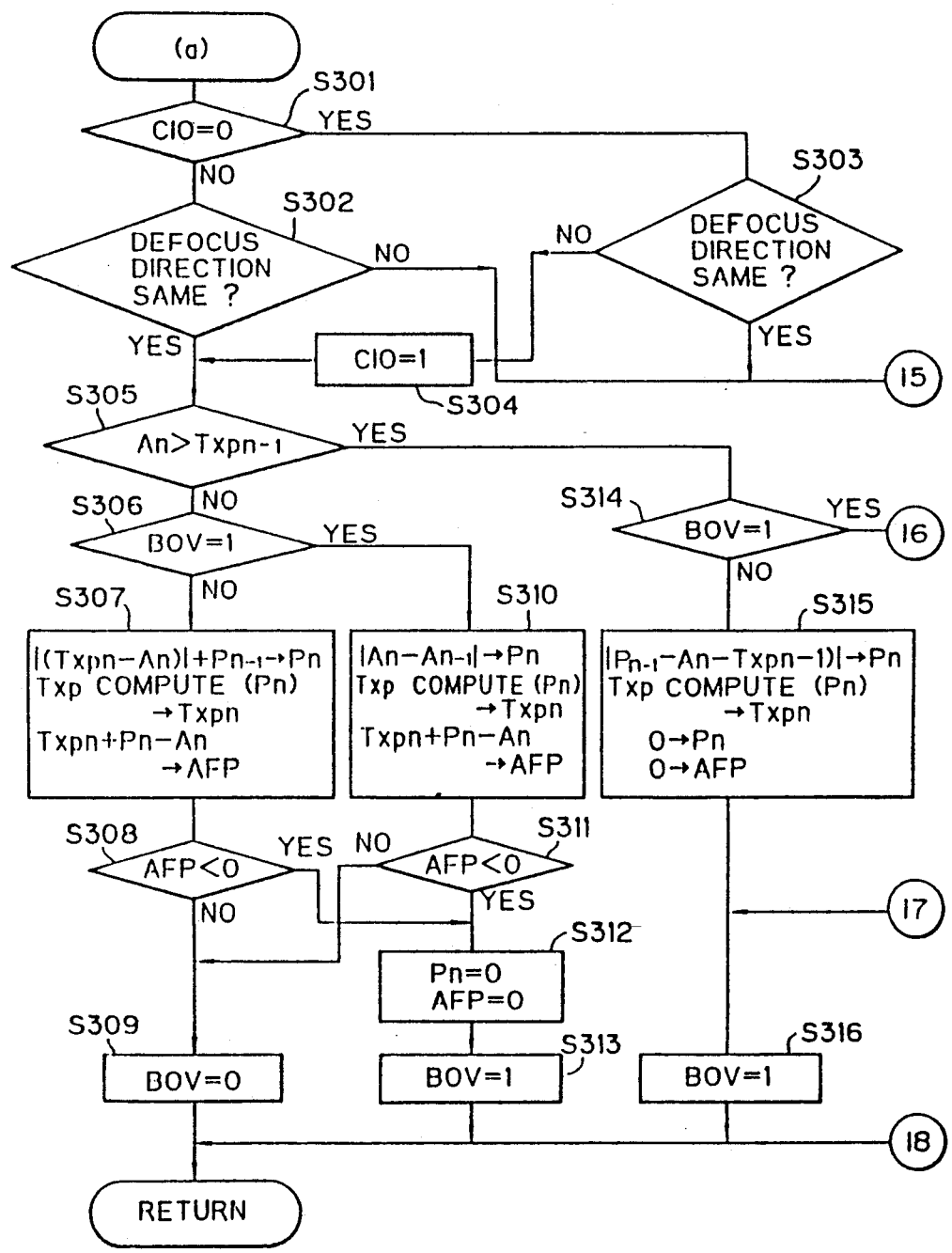

FIG. 9 shows the processing of step S220, one of the alternatives, where the photographing object is approaching the camera.

When the processing comes to this routine for the first time after, compensation ON, flag C10 is set to 0 (step S301) and it is determined at step S303 whether the processing has entered into the preemptive tracking mode with the focusing position stepping over the movement of the object image position. If the defocus direction is different between the previous time and the current time, which means that the processing has entered into the preemptive tracking mode, flag C10 is set to 1 at step S304, and processing advances to step S305. If the defocus directions are the same, it is determined that the catch-up tracking mode remains standing and processing goes to step S323.

When the processing comes to the routine for the second time and subsequent after compensation ON and the preemptive tracking mode has been employed, as C10 is 1 (step S301), it is determined at step S302 whether the defocus direction is the same between the previous time and the current time. Since the processing has already entered into the preemptive tracking mode in the previous cycle, if the defocus directions are different, it means that the situation has changed to the catch-up tracking state from the preemptive tracking state, and processing goes to step S323. When the defocus directions are found to be the same, it means the preemptive tracking state remains continued and processing goes to step S305.

In step S305, defocus amount An, according to the distance measurement of this time, is compared with lens drive amount Txpn-1, which corresponds to the release-time-lag equivalence of the previous time. This is the processing to compensate errors occurred when executing the computation of Pn with the object image speed assumed as being constant, as stated above.

If An>Txpn1, it means the actual object image movement amount is smaller than Pn, and the lens drive amount of the previous time is determined to be too large. Thus, processing enters to the processing for the case of the preemptive tracking amount being too large (Step S314 and afterward). If step S305 is determined to be it means the actual object image movement amount is either equal to or smaller than Pn and the next processing will be for the case where the lens drive amount of the previous time being insufficient or adequate.

Flag BOV in the following steps S306 and S314 represent the result of judgment of the previous step (S305) in the previous cycle. In the case where BOV=1, it represents excessive advance movement, and in the case where BOV=0, it represents insufficient or adequate advance movement. When processing comes to this routine for the first time, processing is carried out under BOV=0.

Step S307 shows the calculations that are performed in the case where An>Txpn-1 is not effected for both this time and the previous time, as illustrated in FIG. 5, and the computation, as has already been explained above with respect to FIG. 5, is executed.

Figure 10:
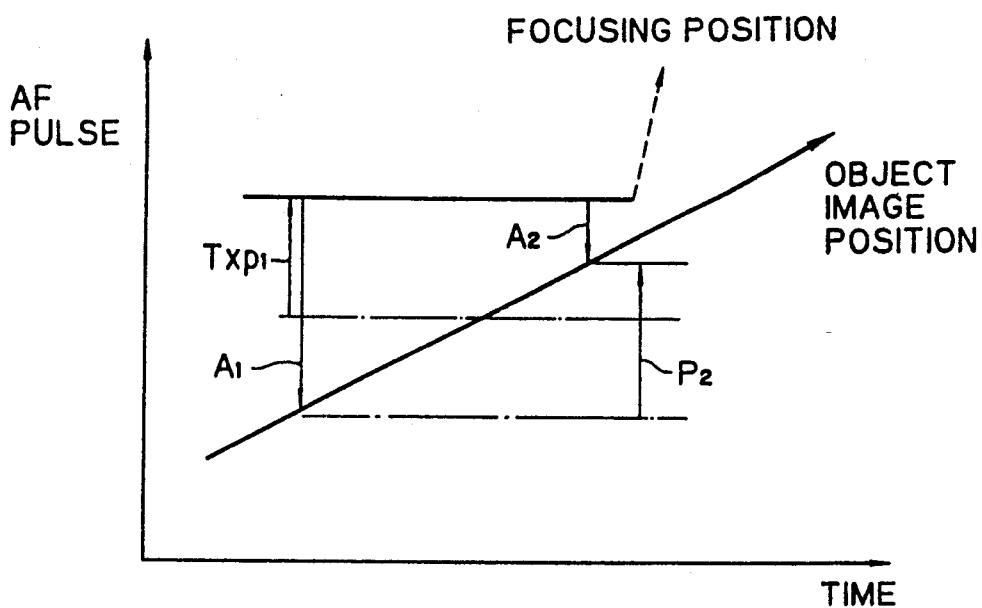
FIGS. 10, 11, 12, 13, 14, 15, 16 and 17 are explanatory graphs for the focus prediction computation on the basis of a moving state of the object-in-motion and the results of lens drive.

Step S310 shows the calculation formula for the case where An>Txpn-1 in the previous time but not in this time, as illustrated in FIG. 10.

In FIG. 10, the compensation amount (object image movement amount) P2 is:

$$P2 = |A2 - A1|,$$

and $$Txp2 = f(P2), \text{ and}$$

the drive amount AFP is:

$$AFP = Txp2 + (P2 - A2).$$

When the above are generalized, the following formulas stand:

$$Pn = |An - An-1|$$

$$Txpn = f(Pn)$$

$$AFP = Txpn + Pn - An.$$

In either case of the above-mentioned steps S307 and S310 being executed, it is examined, in subsequent step S308 or S311 whether AFP<0. Then, in the case where AFP<0, processing goes to step S312, where Pn=0, and AFP=0 are set, respectively, and no lens drive is carried out (No lens drive is carried out in the reverse direction). In either of the cases, BOV is set again on the basis of the computation value of the current time in the subsequent steps S309 or S313.

In the case that where >Txpn-1, the processing goes to loops of steps S314 and subsequent. In this case, as An is larger than Txpn-1, the focusing position has been advanced by the amount more than that corresponding to the release-time-lag, and it is unnecessary to drive the lens. Thus, both the compensation amount Pn and the lens drive amount AFP are set to 0 in either of the cases, and only the computation of Txp is carried out for the next time computation. In step S314, the case determination which is the same as done in step S306 is carried out.

Figure 11:
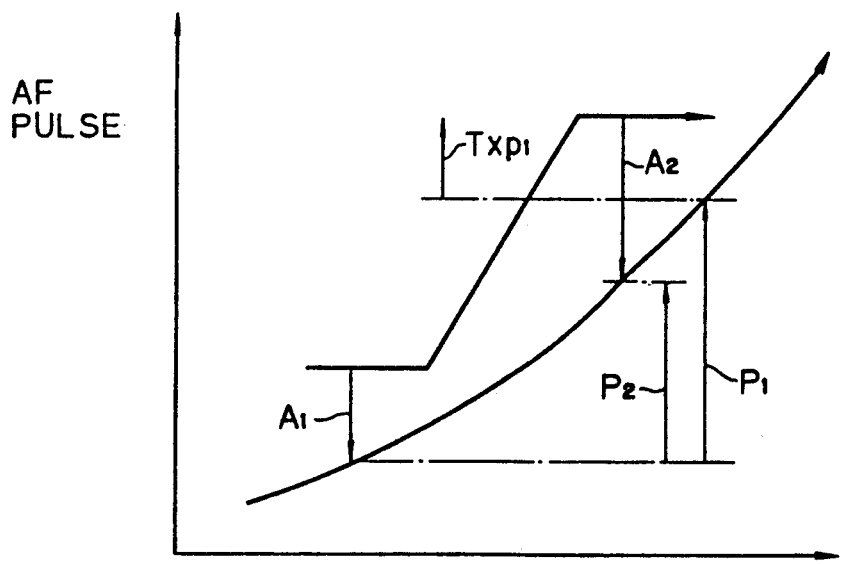
Figure 12:
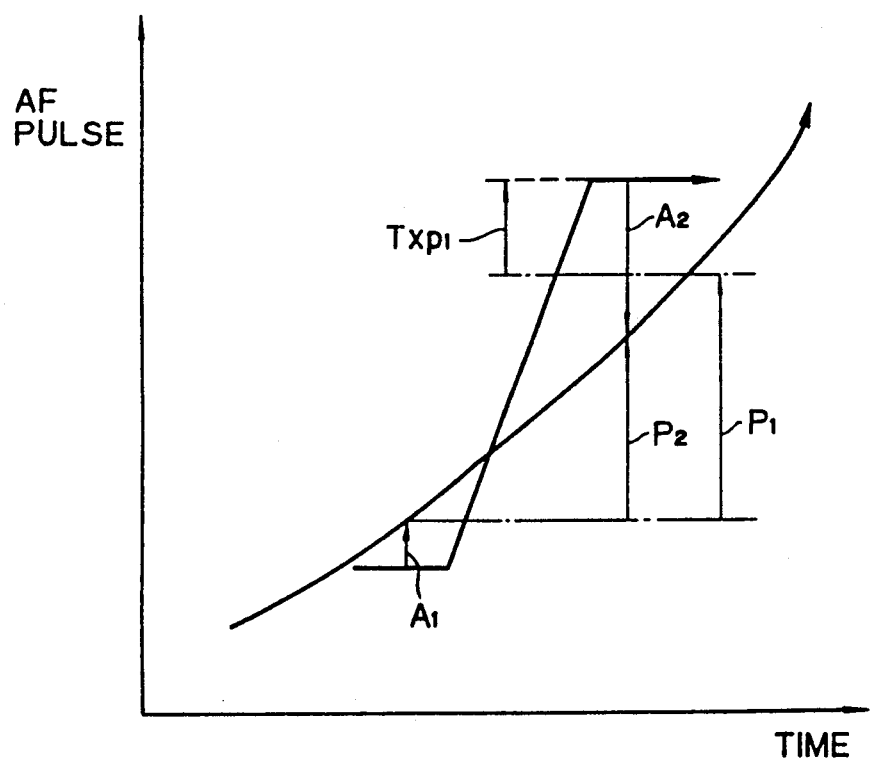

Step S315 comprises the calculations of the case where An>Txpn-1 was not established in the previous time, but An>Txpn-1 in the current time, as illustrated in FIGS. 11 and 12, wherein the compensation amount P2 is represented by:

$$P2 = P1 - (A2 - Txp1).$$

Accordingly, $$Txp2 = f(P2).$$

When generalized, the following formulas stand:

$$Pn = Pn-1 - (An - Txpn-1)$$

$$Txpn = f(Pn).$$

After computation of Txpn:

$$Pn = 0, AFP = 0.$$

Steps S317 and subsequent show the processings for the case where An>Txpn-1 is established in both the previous time and the current time.

In step S317, for the purpose of making a determination of whether the amount of An exceeding Txpn-1 falls within the predetermined focus allowance used for in-focus judgment in step S6 of FIG. 3, i.e., whether the object image position after the elapse of the release-time-lag is within the focus allowance, from the focusing position, the pulse number d equivalent to the focus allowance plus Txpn-1 is compared with An.

Figure 13:
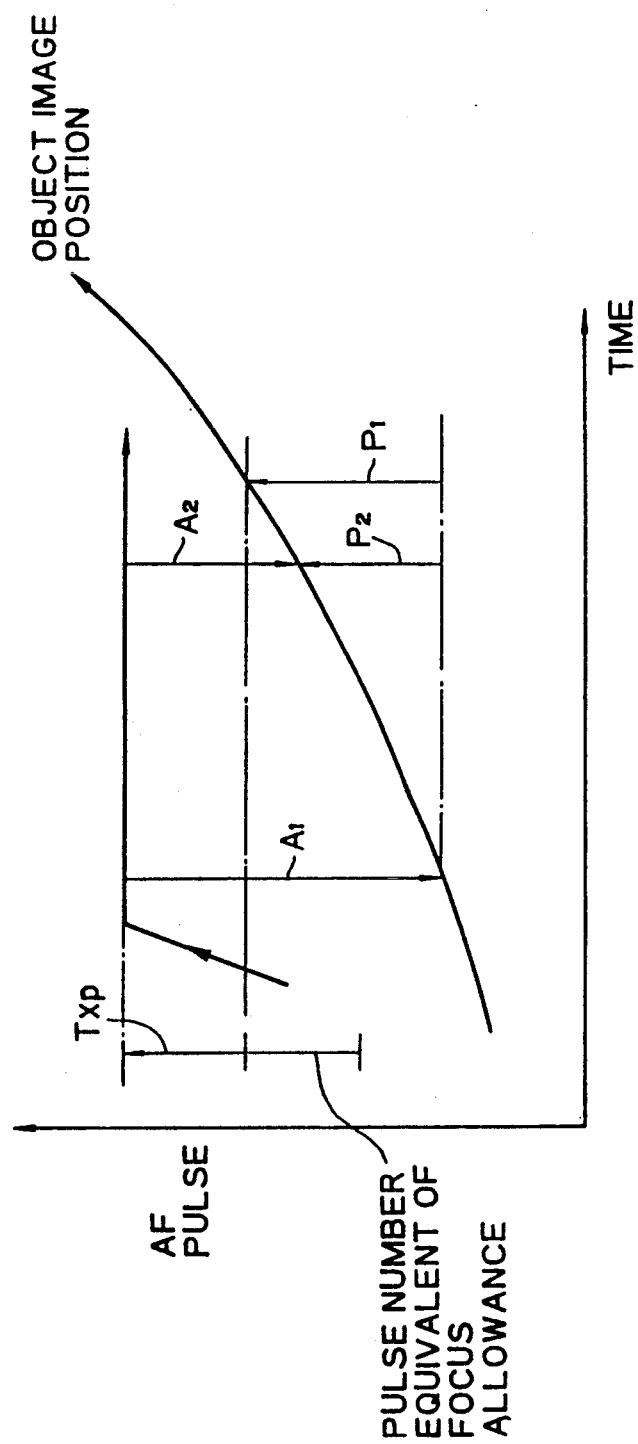

Step S318 is the case where the amount of An exceeding Txpn-1 is smaller, i.e., the case where the object image position falls within the focus allowance after elapse of the release-time-lag, and shows calculation for the case shown in FIG. 13.

From that figure, P2=A2−A1. Accordingly, $$Txp2 = f(P2).$$

When generalized, $$Pn = An - An-1$$

$$Txpn = f(Pn).$$

After computation of Txpn;

$$Pn = 0, AFP = 0.$$

In the case that, in step S317, it is determined that the amount of An exceeding Txpn-1 is not within the focus allowance, processing goes to step S319.

It is determined in step S319 whether the judgment where the amount of An exceeding Txpn-1 is out of the focus allowance occurred three or more consecutive times. If so it is the case where the object image position greatly deviates from the focusing position or the object image movement direction or movement speed has greatly changed. It means that the possibility of the object image position entering within the focus allowance is less, and, in order to discontinue the focus prediction mode, the compensation is OFF in step S322 and all calculated data are cleared. Then, with the data of this time taken as the first time data of AF, the focus prediction computation is carried over again.

Figure 14:
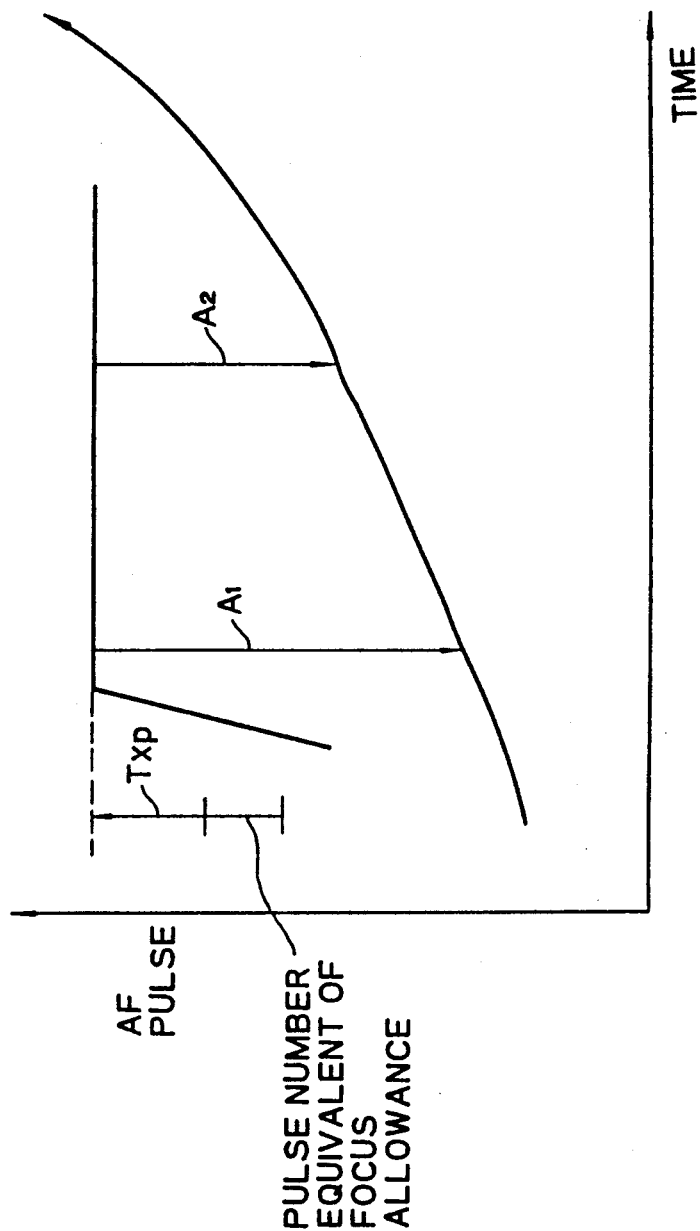

Step S320 is for the calculation of the case shown in FIG. 14 and the contents thereof is the same as for step S318.

Figure 15:
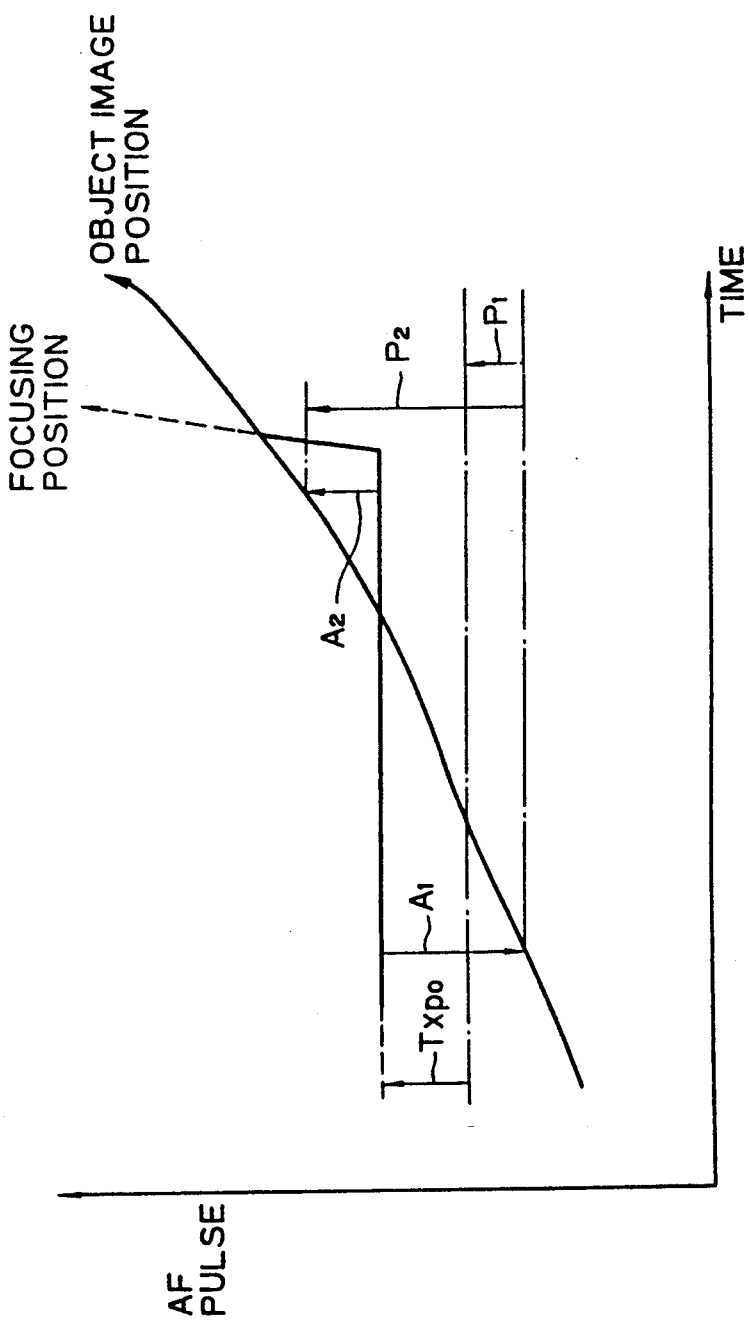

In step S302 and S303 when it is discriminated it is not the preemptive tracking state this time, it is determined in step S323 whether it was $An > Txpn-1$ in the previous time from flag BOV. When it was $An > Txpn-1$ in the previous time, processing goes to step S324. That is the case shown in FIG. 15, where the preemptive tracking was carried out in the previous time but the focusing position is behind the object image position this time.

In this case, the compensation amount P2 is expressed by:

$$p2 = A2 + A1.$$

Accordingly:

$$Txp2 = f(P2).$$

The drive amount AFP is:

$$AFP = Txp2 + P2 + A2.$$

When the above are generalized:

$$Pn = An + An-1$$

$$Txpn = f(Pn)$$

$$AFP = Txpn + Pn + An.$$

Figure 16:
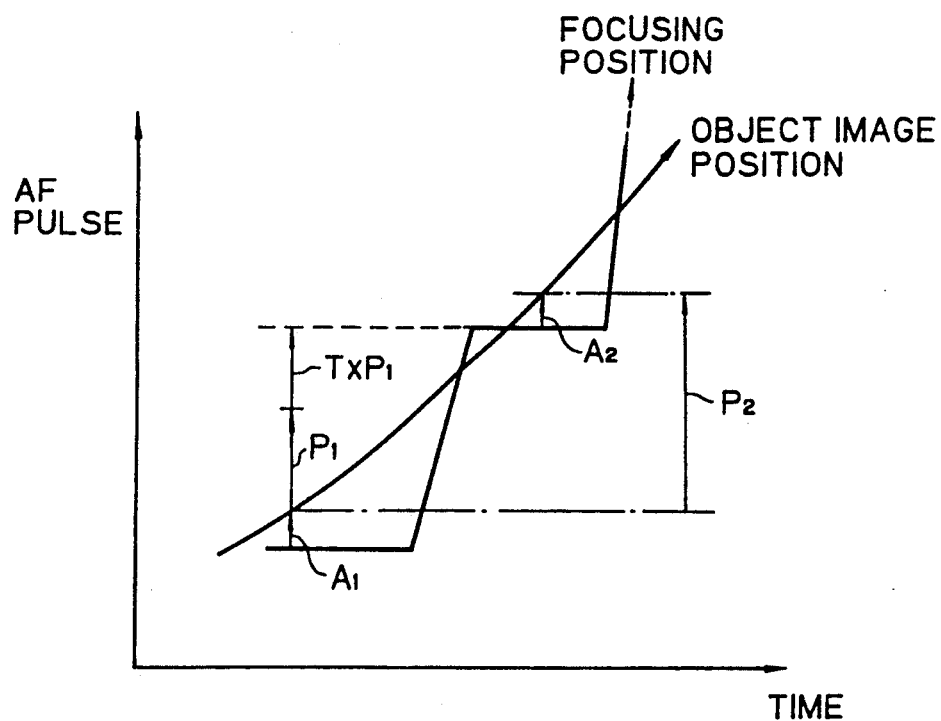
Figure 17:
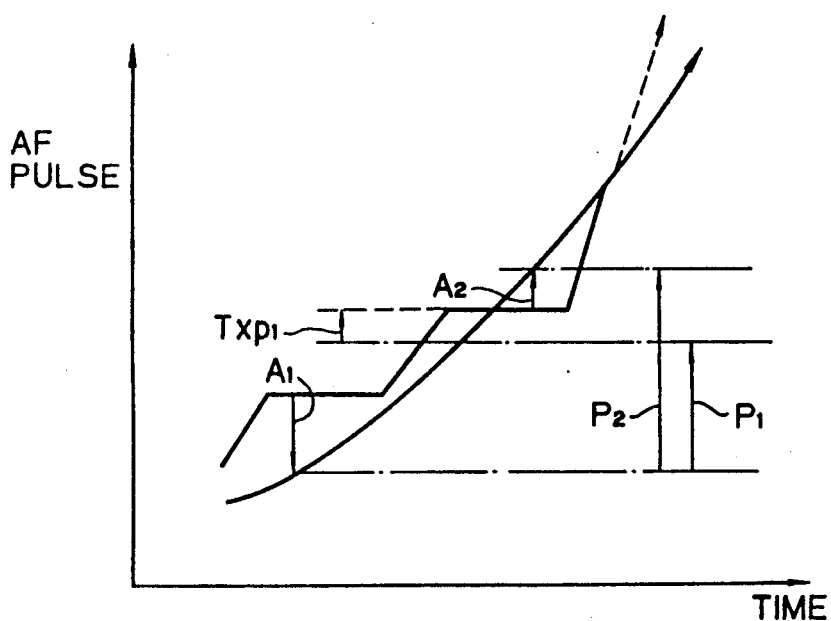

When it is determined in the step S323 that it was not $An > Txpn-1$ in the previous time, processing goes to step S327. FIG. 16 is the case where processing for shifting from the catch-up tracking state to the preemptive tracking state was tried but failed. FIG. 17 shows the case where the preemptive tracking has failed during the preemptive tracking under way. In all the cases, the compensation amount P2 will be:

$$P2 = Txp1 + P1 + A2.$$

Accordingly, $$Txp2 = f(P2).$$

The drive amount AFP will be:

$$AFP = Txp2 + P2 + A2.$$

When the above are generalized:

$$Pn = Txpn-1 + Pn-1 + An$$

$$Txpn = f(Pn)$$

$$AFP = Txpn + Pn + An.$$

After the calculation of step S324 or step S327 is carried out, flag C10 is set to 0 in step S325, and in the next distance measurement, computation of this time will be taken as the first computation after compensation. The Flag BOV=0 is then set in step S326.

In FIG. 7, both steps S221 and S223 are the cases where the photographing object is moving from the near field to the remote field. In the case where object is moving away from the camera at a constant speed, the object image speed gradually slows down, so that the lens drive amount decreases accordingly. If, in the above case, the compensation is made in the preemption of equivalent of the release-time-lag in the manner similar to the case of the object approaching to the camera, there is a high possibility of an over compensation resulting therefrom. In the case that an over compensation occurs, rear-focusing results therefrom, which is not desirable in view of a photographic condition. Accordingly, in the case that where the photographing object is moving away from the camera, the focus prediction without preemption of equivalence of the release-time-lag, i.e., the catch-up tracking, is executed basically.

Figure 18:
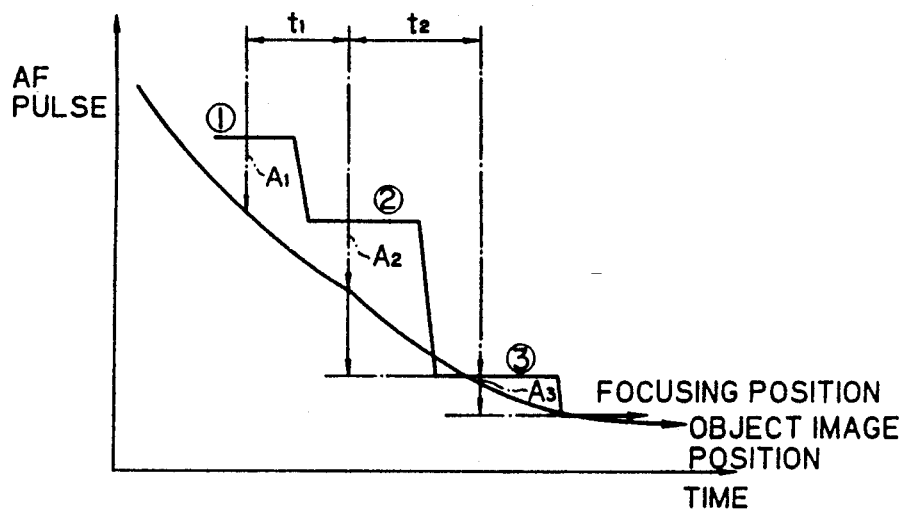
FIG. 18 is a graph explaining an algorithm used for the case where the object-in-motion moving away from the camera.

FIG. 18 is a graph showing the relationship of the object image position and the lens drive pulses for the object moving away from the camera.

In FIG. 18, the motor drive pulse number obtained at point ① is taken as A1. Subsequently, pulse A1 is applied to a motor to drive the lens, and after time t1 has elapsed, pulse number A2 is supposed to have been obtained at point ②. The amount of movement of the object image position between points ① and ② is A2 when converted to the pulse number. Therefore, the object image speed OBJsp between points ① and ② is:

$$OBJsp = A2/t1.$$

Here, the object image position at point ③ where time t2 has elapsed from point ② with the object image position at point ① taken as reference, is, assuming that the object image speed is constant, expressed by:

$$A2 + t2 \times OBJsp.$$

As mentioned in the explanation for the preemptive tracking, t2 is considered to be equal to t1, and the amount of the object image movement during t2 is considered to be equal to A2. Hence, the drive amount is calculated by $2 \times A2$. That is, the focusing position obtained with driving the AF motor by $2 \times A2$ from point ② coincides with the object image position after time t2 has elapsed. In this case, even if interruption processing for release-ON is executed after the lens drive has completed and exposure started after elapse of the release-time-lag, the focusing position is placed in front of the object image position at the time of exposure start, i.e., not in the rear-focusing state. Accordingly, TXP calculation is not carried out and the catch-up tracking is performed.

As above, if it is assumed that, on the basis of the defocus amount A2 obtained at the point ②, the lens drive of $2 \times A2$ has been carried out, and that the defocusing amount A3 has been obtained at point ③, such compensation as for the preemptive tracking is not carried out for the next drive amount, but, as in the previous time drive, simply $A3 \times 2$ is used.

That is, as a general formula to obtain the lens drive amount during the catch-up tracking for the case where the object moves away, the following formula stands:

$$\text{Lens drive amount } AFP = 2 \times An$$

(Where, t1=t2, and the lens drive is assumed to have been carried out in the previous time).

Figure 19:
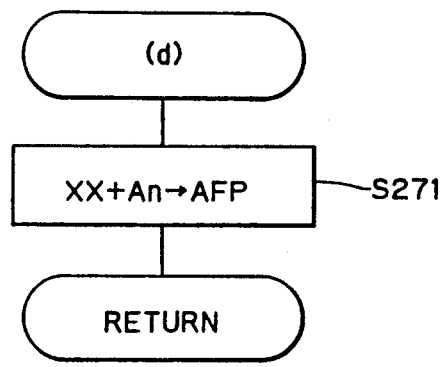
Figure 20:
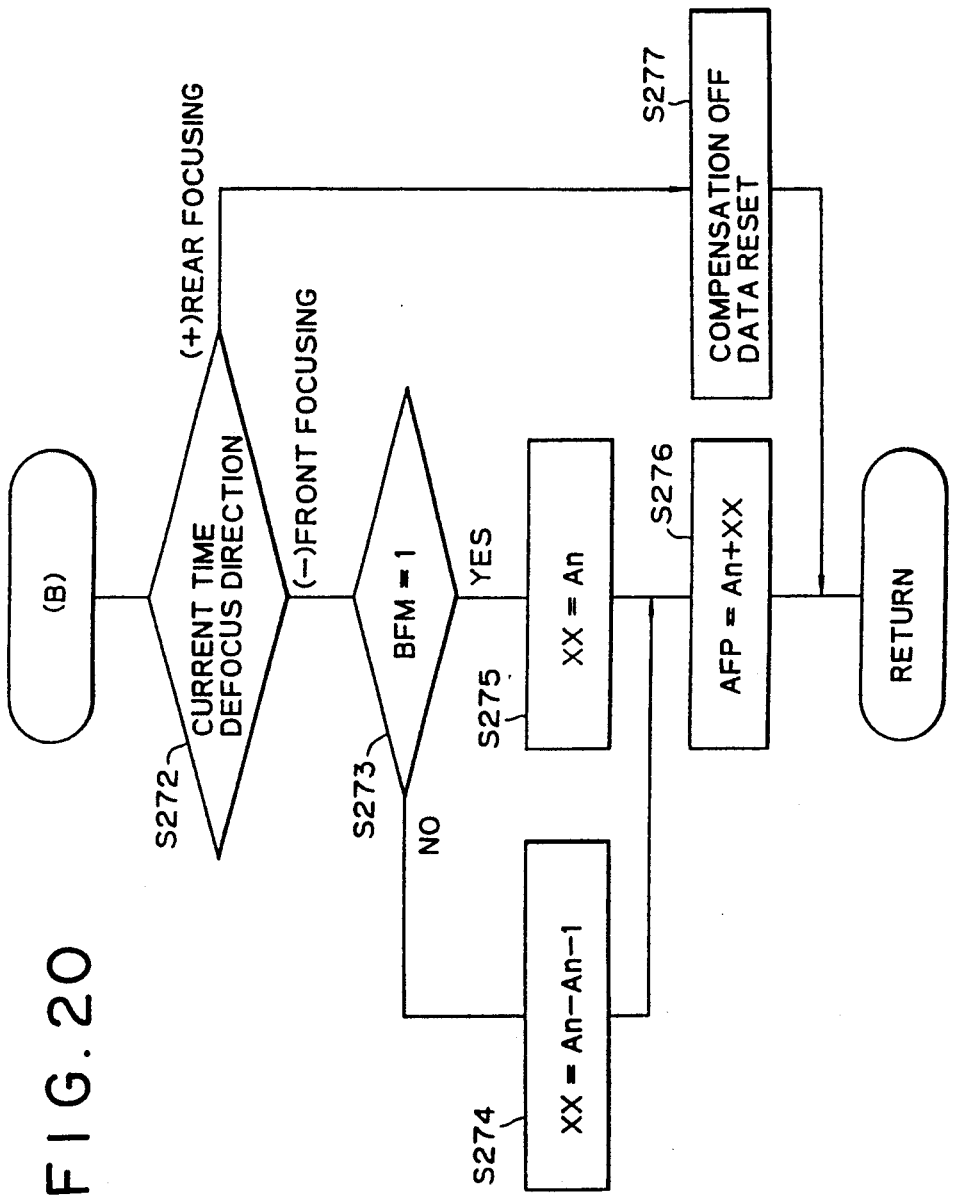

FIGS. 19 and 20 indicate the subroutines of steps S223 and S221 of FIG. 7, respectively.

In FIG. 19, the sum of the object image movement amount (pulse number) XX and the defocus amount An (pulse number) is used as the lens drive amount in step S271. The object image movement amount XX has been calculated in steps S206 through S209 on the basis of whether the lens has been driven in the previous time. In case the lens has been driven in the previous time, XX=An, otherwise, XX=An−An-1. The lens drive amount AFP calculated in step S271 of FIG. 19 never exceeds 2×An.

In FIG. 20, the defocus direction of the current time is checked in step S272. This is the check for avoiding over-compensation which is recognized when the defocus direction after completion of the lens drive is positive, i.e., rear-focusing state, despite that the object is moving away. In the case of an over compensation, the compensation is OFF in step S277, the calculation data is cleared, and the recalculation will be carried out with the data of this time used as the first AF data. After the checking for over-compensation is executed, the object image movement amount is calculated according to whether the lens has been driven in the previous time in subsequent steps S273 through 275, as well as in the steps S206 through S209 of FIG. 7, and the lens drive amount AFP is set in the step S276. The above are the same as in the case of FIG. 19.

Here, the in-focus judgment of steps S6 of FIG. 3 is explained. A determination is made according to whether the defocus amount obtained at step S2 is within the predetermined focus allowance, as described previously. However, in the preemptive tracking mode, the lens drive is always carried out to have the preemption equivalent of the release-time-lag, so that the defocus amount is not necessarily within the focus allowance, even through the in-focus condition will be obtained after an elapse of the release-time-lag.

Also, even though the defocus amount is within the focus allowance at the time of the distance measurement, it does not mean that it is within the focus allowance after an elapse of the release-time-lag. Thereupon, the in-focus judgment can not be done from the defocus amount.

Hence, in step S217 of FIG. 7, the defocus amount for the in-focus judgment is calculated, which will be described in association with FIG. 23.

In step S51, the lens drive amount Txpn-1 that is equivalent to the release-time-lag obtained by the AF processing in the previous time is converted from the number of pulses to an image plane defocus amount DD by dividing Txpn with K-value.

Then, in step S52, regardless of the sign (+or −) of the defocus amount DEFOCUS obtained by the distance measurement of this time, the image plane defocus amount DD is added thereto to be - taken as a focus-check defocus amount. Meanwhile, in the case of the catch-up tracking, as the lens is not driven additionally by the amount equivalent to the release-time-lag, such calculation of the focus-check defocus amount as above is not executed.

According to the above, the lens is driven in advance by an amount equivalent to the release-time-lag in the case where photographing object is approaching the camera, so that a considerable rear-focusing does not occur whenever the shutter release is turned ON and the photography under in-focus state is always possible.

On the other hand, in the case where photographing object is moving away from the camera, the algorithm to carry out the catch-up tracking is used, so that an over-compensation, which results in a rear-focusing, does not occur and a well-focused photography will be possible.

Meanwhile, in the distance measurement operation, intervals for sampling the distance measurement data can be made shorter if the integration time is taken shorter, and tracking of the photographing subject becomes easier. So, the integration may be controlled with the time limit.

Figure 21:
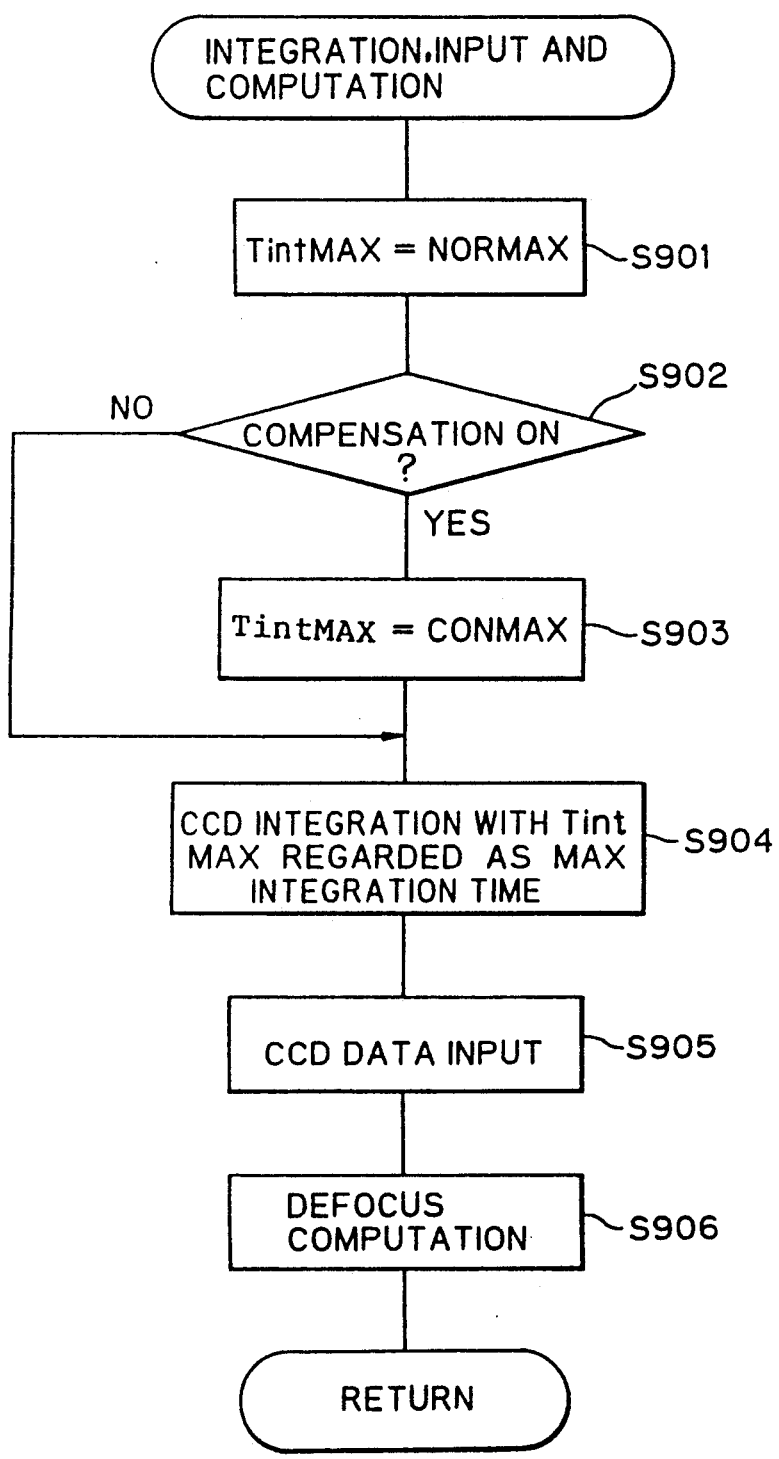
FIG. 21 is a flow chart showing the processing for the case where the integration time is limited.

FIG. 21 is a flow chart for the case where a time limit is set to the integration. That is, usually, the maximum value of integration time Tint MAX is set as the normal maximum integration time NORMAX (step S901). However, if it is determined that the compensation is ON at step S902, the maximum integration time CONMAX for compensation, which is smaller than the normal maximum integration time NORMAX, is used as the maximum value for the integration time Tint MAX (step S903). Thus, the distance measurement in the integration time shorter than normal is executed during the time compensation ON. That is, the CCD integration with Tint MAX regards as the maximum integration time is executed at step S904, and the obtained CCD data is input at step S905 to execute the computation of the defocus amount (step S906).

Figure 22:
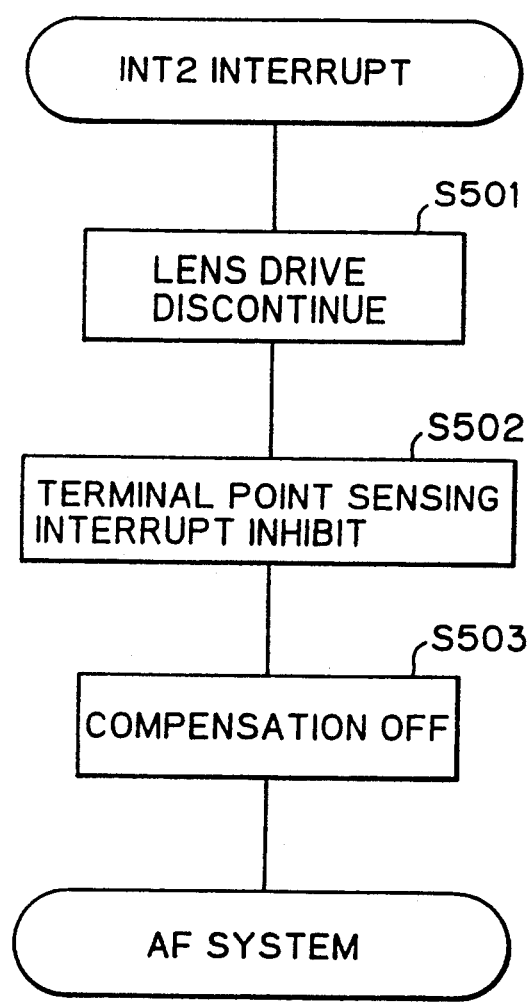
FIG. 22 is a flow chart showing the processing for the case where a terminal point is detected during the lens drive under the focus prediction.

Further, as previously mentioned, it is conceivable that the lens may be driven to the terminal point during the tracking drive. So, during the lens drive, in the S15 of FIG. 3, terminal point sensing circuit 11 (FIG. 1) is reset, and an INT2 interruption is permitted. In the case that no pulse is entered from encoder 5 during a certain period of time to the terminal point sensing circuit 11, INT2 interruption of INT2 of the CPU 3 occurs. That is, in the case where the lens has been driven to the terminal point during the lens drive, no pulse is generated by the encoder 5, so that the terminal point sensing circuit 11 is turned ON and the interruption of INT2 occurs. FIG. 22 is a flow chart of this interruption processing. When an interruption occurs, the lens drive is discontinued, the terminal point sensing interruption is inhibited, and then, the compensation is OFF (steps S501 through S503). In case that no interruption occurs and the lens drive has completed in step S16-3 of FIG. 3, the INT2 interruption is inhibited.

Figure 24:
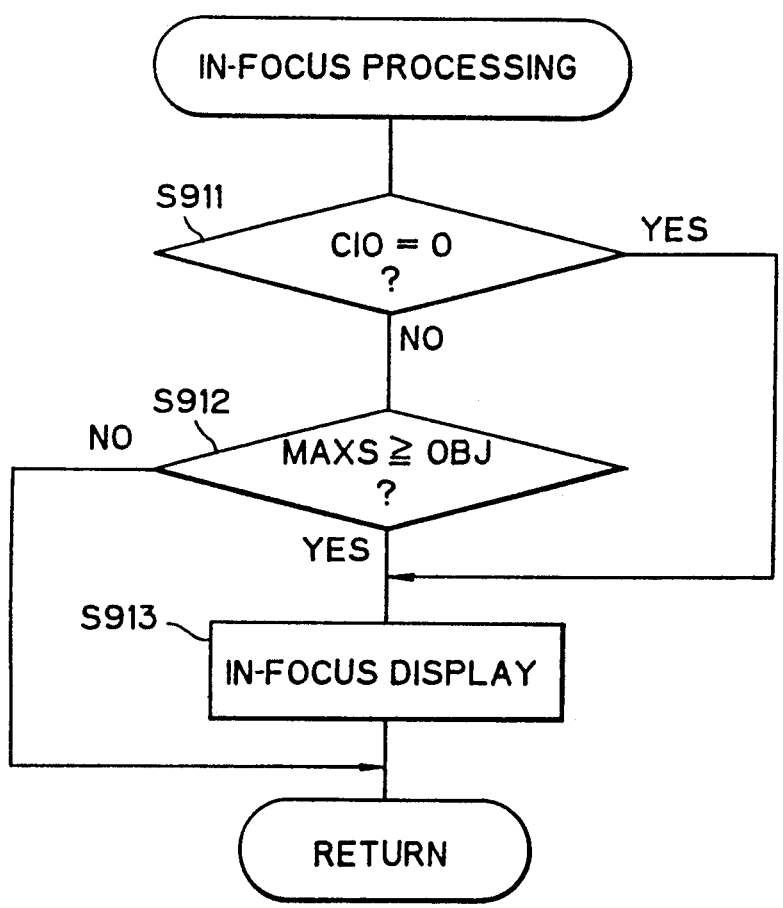
FIG. 24 is a flow chart for a focus indication under the focus prediction.

FIG. 24 is a subroutine showing an example of an in-focus processing of step S7 in FIG. 3, wherein the in-focus LED is lit by LED drive circuit 10 (FIG. 1) to inform an operator that the camera is in an in-focus state. It is desirable that the in-focus LED is provided in the viewfinder of the camera. Here, in cases other than C10=1, only an in-focus indication is executed and processing returns.

When C10=1, i.e., the preemptive tracking is being executed, and when

MAX $AFP$ speed/Kvalue $\geq$ OBJsp (mm/s)
where,

MAX $AFP$ speed: Maximum drivable speed (Pulse/s)
OBJsp: object image speed (mm/s), the in-focus indication is always carried out. Thus, even during the preemptive tracking, in-focused photographs can always be ensured, as long as the in-focus indication is ON (In the flow chart, MAXS=MAX AFP speed/Kvalue, OBJ=OBJsp).

In the case where the object image speed exceeds a tracking speed limit, i.e., when MAX AFP speed/Kvalue < OBJsp (mm/s)

stands, the preemptive lens drive of the release-time-lag equivalence is impossible. Therefore, a well-focused photograph can not be obtained if the shutter is released, so that in this case the in-focus indication is not given.

In the preemptive tracking mode, as the preemptive lens movement equivalent of the release-time-lag is carried out, when the AF switch S1 is first closed to drive the lens to the in-focus position, and the release switch SWR is closed upon completion of the lens drive, the object image position and the focusing position coincide at the time when the exposure starts.

However, if the release switch SWR is closed at timings other than the above, or if the release switch SWR is simultaneous closed with the closure of the AF switch SW1 and the shutter release ON interruption is permitted after elapse of the predetermined time subsequent to the lens drive, the start point of the release-time-lag presumed in advance and the actual timing of the shutter release ON interruption do not coincide. Further, in case of the catch-up tracking, the release-time-lag is not taken into consideration. Accordingly, in such cases, the object image position and the focusing position do not always coincide at the time when exposure starts. For this reason, if it is designed such that the lens is driven for a further possible amount as well even during the release-time-lag, still more accurate focusing can be achieved.

Moreover, when photographs are to be taken several times consecutively in the preemptive tracking mode, a high tracking ability can not be obtained if the AF operation is restarted after the exposure, a mirror descent and a film winding has completed. Since the distance measurement becomes possible again after the mirror descent, it should be started immediately after the mirror descent, regardless of wherein the film winding is completed. Then, the lens drive should be carried out for the sum of the drive pulse number obtained by the distance measurement of this time and that of the previous time before the shutter release. Thereby, the tracking ability can be improved.

Figure 26:
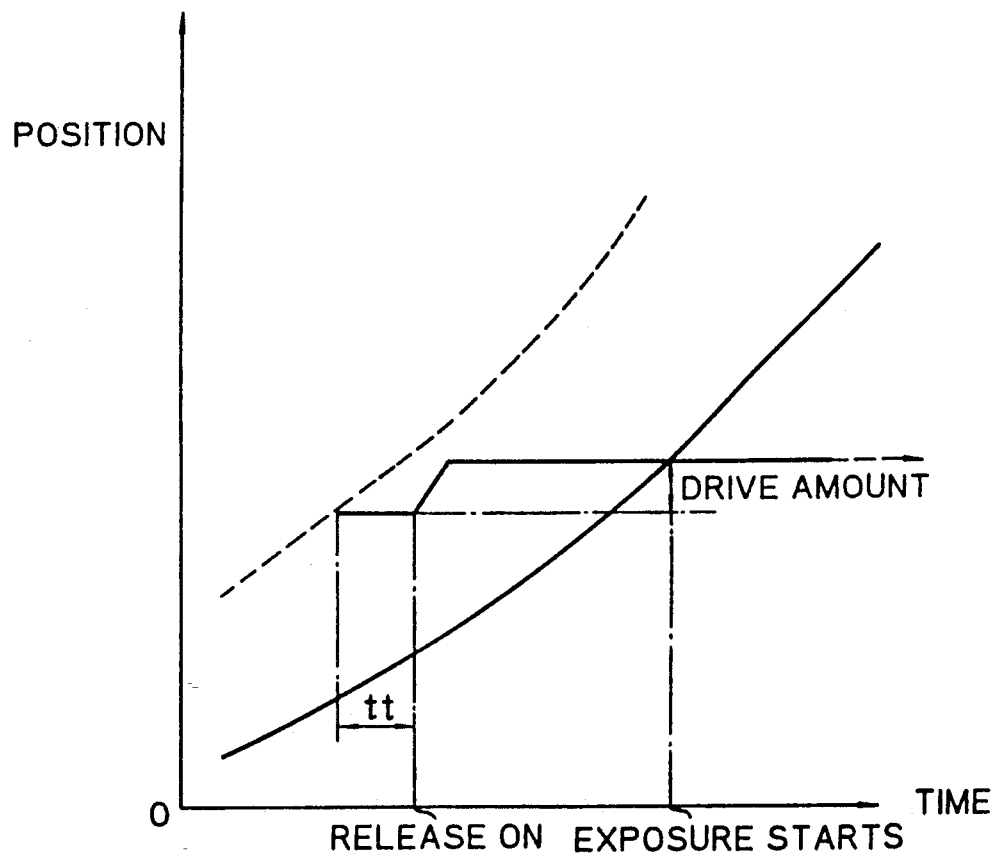
FIGS. 26, 27 and 28 are graphs corresponding to the processing according to FIG. 25.
Figure 27:
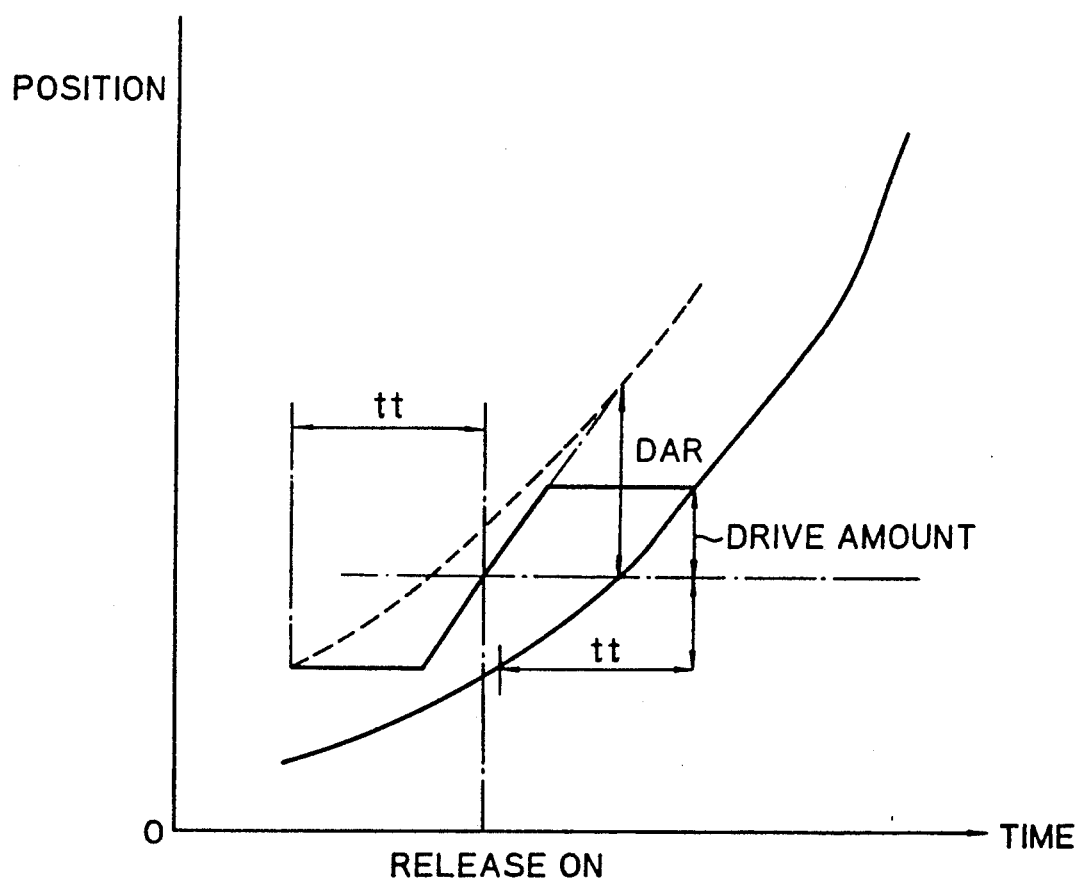

FIG. 25 is the flow chart of the release-ON interruption processing prepared by taking the above into consideration. FIGS. 26 and 27 show the states of the lens drive controlled with this flow chart.

FIG. 26 shows the case where the release-ON interruption occurs during the lens stoppage, while FIG. 27 shows the case where the release-ON interruption occurs during the lens drive.

In step S8 of FIG. 3, the interruption for the release-ON processing is permitted, and the above processing starts by an interruption caused by a shutter release ON signal from the release switch SWR.

Firstly, the mirror ascent and lens stopdown control are executed at step S601, and it is determined in step S602 where the compensation is ON. When the compensation is OFF, a normal shutter release control and film winding upon mirror descent are executed at steps S603 through S605 to complete the interruption processing. When the compensation is ON, it is determined at step S607 whether the lens is being driven. Based upon this determinmation, the lens drive amount AFP is set over again in either step S608 or S609.

In the case where the lens is not being driven, in step S608, the object image movement amount as from completion of the previous time the lens drive is calculated based upon the elapse of time tt from completion of a previous time lens drive, shown in FIG. 26, according to the formula:

OBJsp × K value × tt, and the obtained value is newly set to AFP.

On the other hand, in the case where the lens is being driven, at step S609, the already driven equivalence, (AF − Dar)

where, Darr equals the Remaining lens drive amount, and

AFP equals the Current lens drive set value, is subtracted from the lens drive amount (the same as for the above-mentioned step S608), OBJsp × Kvalue × tt, to be executed during time tt as from the previous time lens drive completion, shown in FIG. 27, and the result is set as a new lens drive amount AFP.

In the case where the AFP newly set in step S608 and S609 exceeds the maximum pulse number MXM capable of being driven during the release-time-lag, then, in step S611,

AFP = MXM is set. According to the AFP set as above, the lens is driven and exposure is performed (steps S612 and S613).

When the mirror descent completed (step S614), the next distance measurement, i.e., integration, data input and computation are carried out at step S615 simultaneously with film winding, and the defocus pulse number An is computed in step S616.

Figure 28:
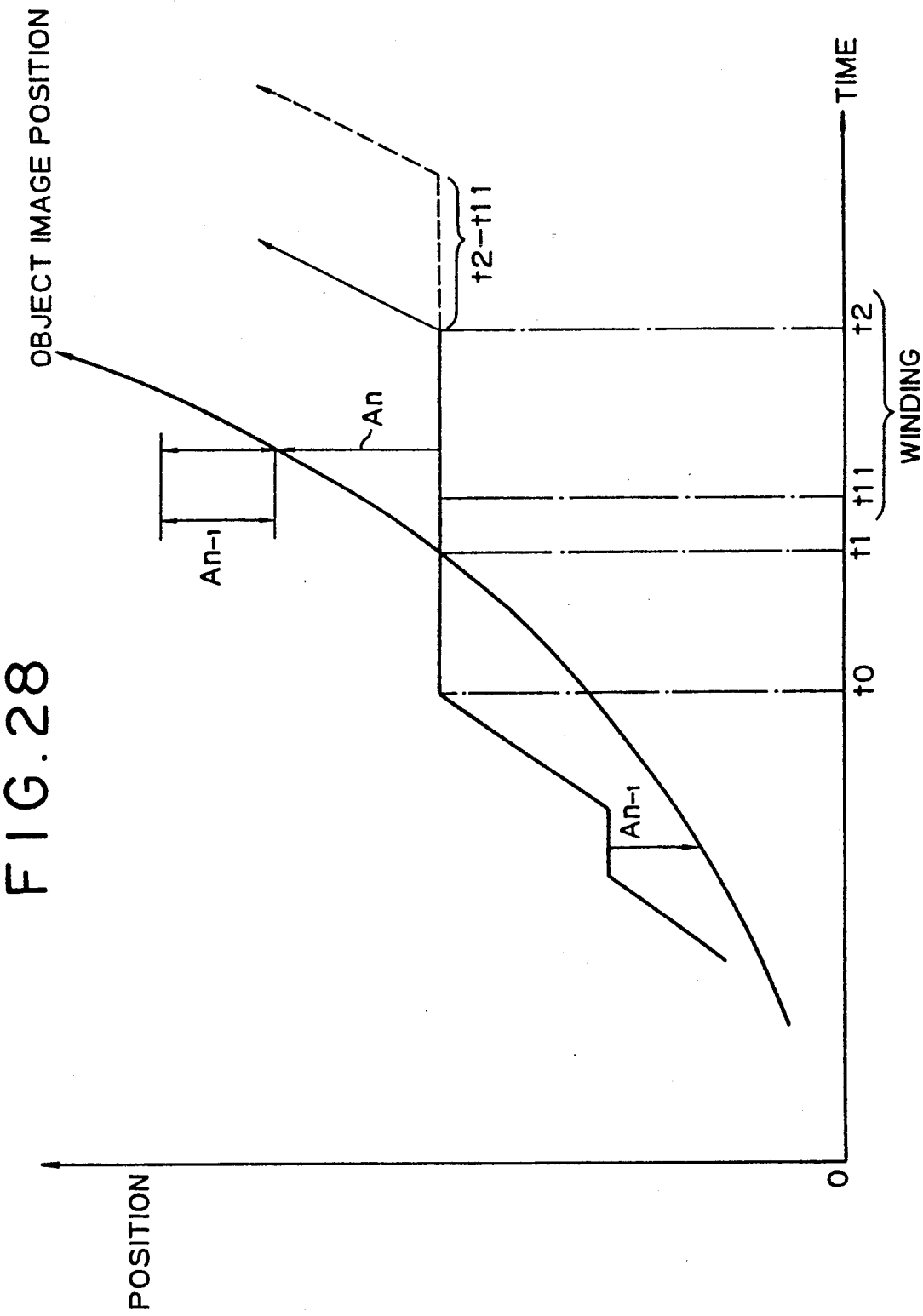

Here, with reference to FIG. 28, the function for the increasing tracking ability by means of starting the next tracking action immediately when the distance measurement becomes possible after the shutter release has completed is, explained. That is, the racking ability can not be raised if the next time distance measurement computation, etc., are started after the film winding is completed subsequent to completion of the shutter release under the tracking mode. Since the distance measurement is possible after the mirror descent, after the mirror has ascended at t0, the shutter release is started at t1, and at t11 when the mirror descent is completed, the distance measurement is started and the defocus pulse An is obtained. Then, the defocus pulse number An-1 obtained by the distance measurement of the previous time is added to the defocus pulse number An and the result thereof is used as the new lens drive amount AFP.

Thus arranged, the tracking action can be taken faster by t2 − t11, as illustrated by a solid line in FIG. 28, than the case illustrated by dotted line in FIG. 28, where the next distance measurement is started after t2 when the film winding is completed subsequent to the mirror descent. Then, AFP is taken as the sum of the previous time defocus amount An-1 and this time defocus amount An (step S617), and flag AIS is cleared, the compensation is OFF, and the release-ON interruption processing is terminated (step S618). After termination of interruption, processing shifts to LMOV of FIG. 3, and the lens is driven at the above-mentioned drive amount AFP.

Figure 29:
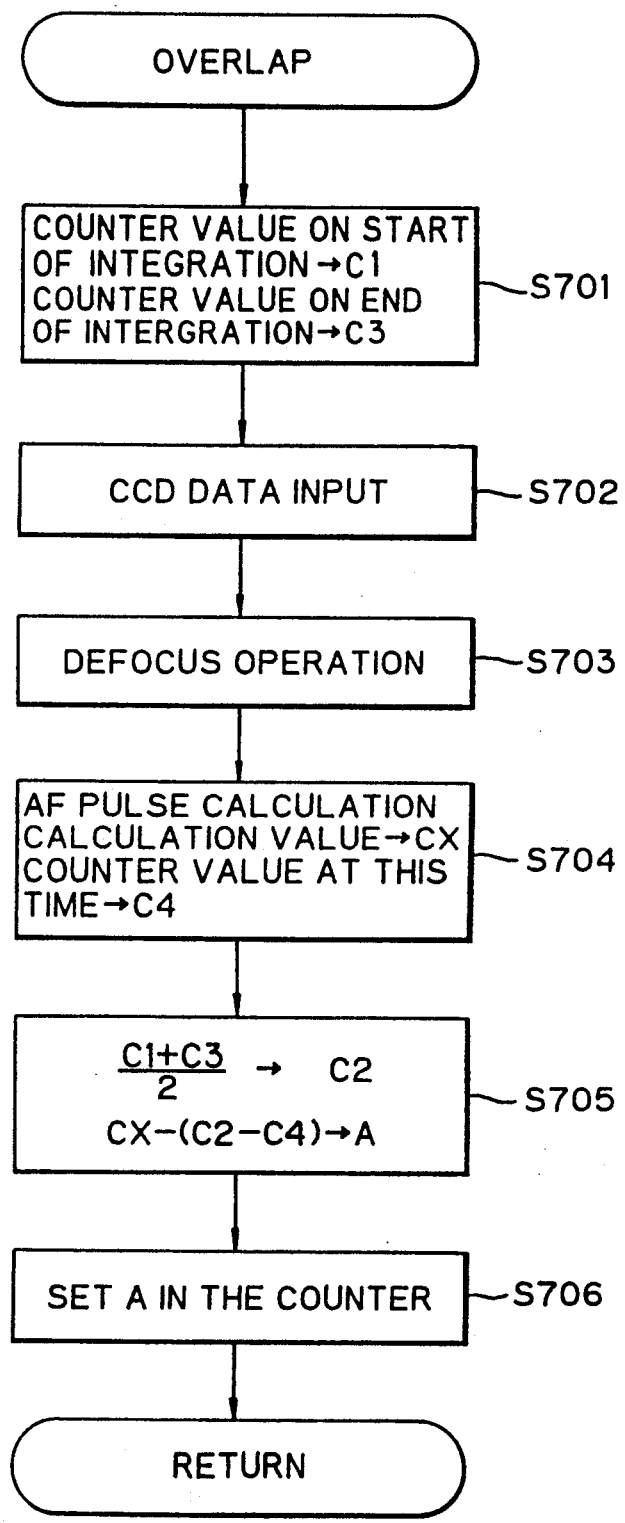
FIG. 29 is a flow chart showing the processing for overlap.
Figure 30:
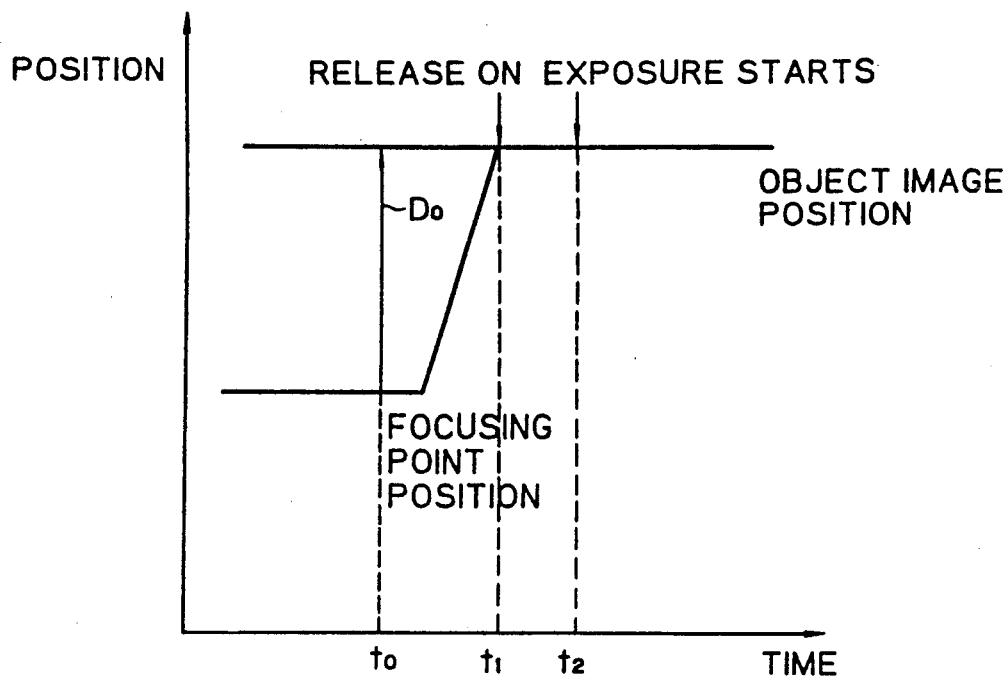
Figure 31:
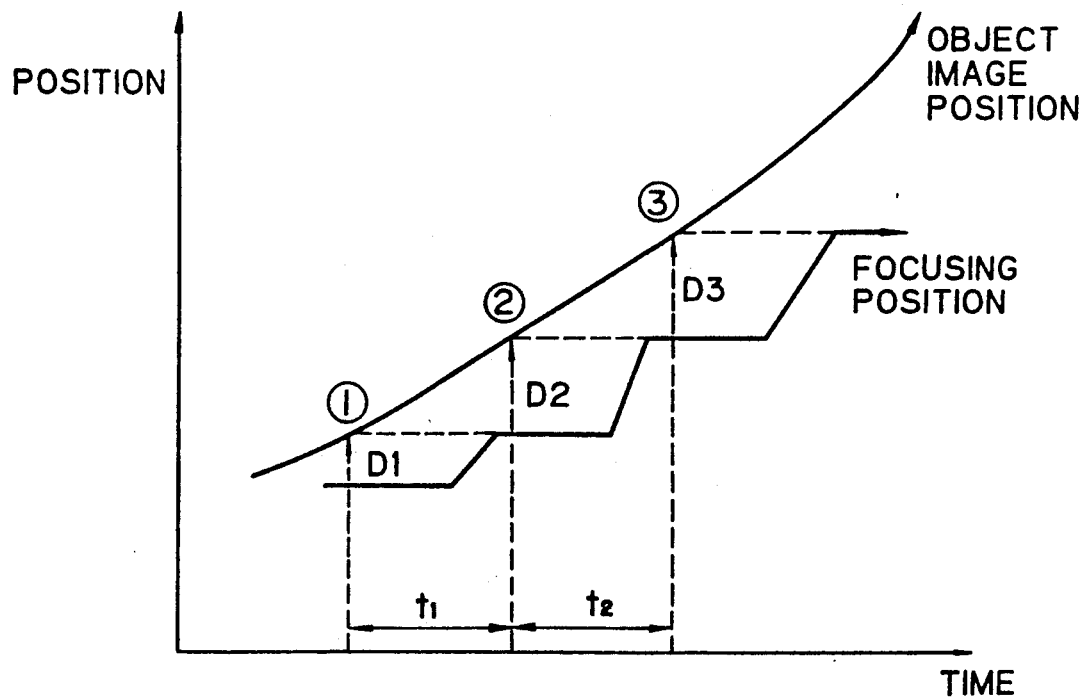

FIG. 29 is a flow chart showing a series of instructions for a so-called overlap processing, wherein a further distance measurement is repeated, while the lens is being driven, to obtain a more accurate lens drive amount.

If, in the first distance measurement, an object which stands far away from the in-focus position at that time is measured, the obtained defocus amount itself includes an extensive error, so that the lens drive amount obtained is not accurate. Accordingly, the focusing action will not be carried out satisfactorily. Hence, by renewing the lens drive amount even when the lens is being driven to execute accurate focusing action, the overlap processing is employed.

As usual, the originally computed lens drive pulse member which is continuously discriminated with driving of the lens is set to counter 6. During the time the lens is being driven, the CCD integration starts. In step S701, the lens drive pulse number remaining in counter 6 at the time the integration started is taken as C1 and the lens drive pulse number remaining in counter 6 at the time of completion of integration is set at C3. In step S702, the CCD integration data is inputted, and the defocus amount is obtained by computation of the CCD integration data in step S703. In step S704, the AF pulse number is calculated based upon the defocus amount thus obtained, in the same manner as step S3 of FIG. 3, and the calculated value is taken as Cx. The lens drive pulse number in counter 6 at the time of calculation of Cx is taken as C4. In step S705, the lens drive pulse number for renewal of the lens drive pulse number in counter 6 is obtained by the following formula:

$$C2 = (C1 - C3)/2$$

$$A = Cx - (C2 - C4).$$

The above-mentioned A is the renewed lens drive pulse number which is set to counter 6 in step S706 and processing is terminated.

Meanwhile, as is apparent from steps S17 and S18 of FIG. 3, when the compensation is ON, i.e., when under the tracking mode, the overlap processing is not carried out. That is because, as mentioned previously, the overlap processing is the processing necessary in the case where the defocus amount is large. But, when the compensation is ON, the focusing lens is tracking the object image position and so the defocus amount is not so extensive. Further because, there would occur such problem as the AFP value obtained for tracking being renewed by the AFP calculation executed for the overlap processing carried out in the routine other than the main routine so that the tracking action itself may become impossible.

With the automatic focusing device mounted on the camera as described above, the focus lens is controlled in such a manner that when the object image position is moving at the speed exceeding the predetermined one, i.e., the photographing object is the object-in-motion, tracking with two different algorithms is executed. That is, when the object is approaching the camera, the preemptive tracking is selected, wherein the focus lens is moved in the preemption of equivalent of the release-time-lag. On the other hand, when the object is moving away from the camera, the catch-up tracking, wherein no preemptive lens drive is executed, is selected. Hence, even if the photographing object is the object-in-motion, the adequately focused photography can be taken.

When entering into the tracking mode, it is carefully confirmed that the photographing object is the object-in-motion by repeating the measurements of the object image speed more than the stipulated plurality of numbers.

Further, even in the case where the focus lens is already positioned within the focus allowance and the in-focus indication is made, if processing is under tracking mode, focus lens is further driven for tracking the object-in-motion so as to obtain the complete in-focus state.

The release-time-lag used for tracking computation is that obtained by taking the integration time for the distance measurement into consideration, whereby a smoother tracking action becomes possible.

In the case where the release-ON interruption does not occur immediately upon termination of the lens drive, the focus lens may further be driven by the amount as much as possible within the release-time-lag, whereby the defocus amount can be made still less.

Further, in the case of continuous shots and so on, by starting the distance measurement for the next shot at a certain time while the shutter release operation for the current shot is being executed, for instance, at the time of completion of the mirror descent, a consecutive and adequate tracking can be executed.

The in-focus indication during the tracking operation is to be done when the in-focus state is obtained and tracking is possible. It is desirable to make lighting of the LED for in-focus indication recognizable in the viewfinder of the camera.

Although, in the above explained embodiment, processing enters into tracking with focus prediction when it is twice determined that the object image speed exceeds the predetermined value, it can be set as in excess of a predetermined number of times other than two. Further, although tracking is terminated as tracking is not properly performed if it is determined three times that the lens drive amount during the tracking operation exceeds the predetermined value, it can be set as in excess of a predetermined number of times other than three.

There is the possibility that the integration/computation time is so long that a subsequently executed lens drive cannot follow the object image movement. Accordingly, the integration time is limited during tracking operation to curtail the total distance measurement time, whereby tracking is effectively executed.

Further, in the case where the object image speed is high, and accordingly, the lens drive amount becomes relatively large, the overlap processing is considered necessary. During the tracking operation, however, the required lens drive amount is normally small, or if the required lens drive amount is considerably large, it can be the case that the object image speed so high that tracking can not be performed. Accordingly, the overlap processing is not performed under the tracking mode for ensuring tracking lens drive ability.

Meanwhile, in the above embodiment, a description is given of the case where the shutter release is executed upon achievement of an in-focus condition, i.e., the focus-priority case. The present invention can, of course, be applied to a shutter-release priority case where the shutter release can be executed regardless of the focus state. In the latter case, steps S6-1 and S8 of FIG. 3 should be skipped so as to make the release-ON interruption always possible.

The present disclosure relates to subject matters contained in Japanese Patent Applications Nos. HEI 2-332865, HEI 3-103988, HEI 3-103989, HEI 3-103990, HEI 3-104057, HEI 3-104058, HEI 3-104059, and HEI 3-104060 (filed on Nov. 29, 1990, Feb. 8, Feb. 8, Feb. 13, Feb. 13, Feb. 13, and Feb. 13, 1991, respectively) which are expressly incorporated herein by reference in their entireties.

What is claimed is:

1. An automatic focusing device, comprising:
   a focus lens that is movable along an optical axis thereof;
   drive means for driving said focus lens;
   distance measuring means for obtaining a defocus amount of said lens;
   detecting means for determining the relative direction of movement of an object with respect to said focus lens from at least two relative directions, along said optical axis, based upon defocus amounts obtained by said distance measuring means; and
   drive control means for controlling said drive means to drive said focus lens, based upon the relative direction determined by said detecting means, to a position where an in-focus condition is obtained with respect to said object after elapse of a predetermined time,
   wherein said drive control means comprises means for determining a drive amount of said focus lens using different algorithms selected in accordance with said relative direction of movement of said object determined by said detecting means, wherein only one of said algorithms uses a factor related to release time lag.

2. The automatic focusing device of claim 1, wherein said drive control means determines said drive amount so as to bring said focus lens to an in-focus position with respect to said object at a time of completion of said lens drive, when said relative direction of movement of said object is determined to be moving away from said focus lens, while said drive control means determines said drive amount so as to bring said focus lens to said in-focus position with respect to said object at a time when a certain time has elapsed from completion of said lens drive, when said relative direction of movement of said object is determined to be approaching said focus lens.

3. The automatic focusing device of claim 1, wherein an object speed is detected as a speed of movement of an image of said object formed by said focus lens.

4. The automatic focusing device of claim 1, wherein said predetermined time comprises a sum of a time required for obtaining said defocus amount by said distance measuring means and a time required for executing said lens drive by said drive control means.

5. The automatic focusing device of claim 1, wherein said in-focus condition is provided with a predetermined allowance.

6. The automatic focusing device of claim 1, further comprising means for checking whether said defocus amount obtained by said distance measuring means is effective; and wherein said drive control means is disabled if said checked defocus amount is ineffective.

7. The automatic focusing device of claim 2, further comprising means for determining whether said relative direction of movement of said object has changed; and wherein said drive control means which is driving said focus lens in accordance with a selected one of said algorithms is disabled, when said determining means consecutively determines more than a predetermined number of times that said relative direction of movement of said object has changed.

8. The automatic focusing device of claim 1, further comprising means for determining whether said focus lens reaches a terminal end of a driving range thereof; and wherein said drive control means is disabled, when said determining means determines that said focus lens reached said terminal end of said driving range thereof.

9. The automatic focusing device of claim 1, wherein said distance measuring means employs a phase-differential detecting method, a light amount received from said object being integrated to compute said defocus amount; and wherein a time required for said integration is limited to a predetermined length in case said drive control means id enabled.

10. The automatic focusing device of claim 1, further comprising an overlap control means for repeatedly executing distance measurements and computations during said lens drive so as to renew a lens drive amount required to obtain said in-focus condition; and wherein said overlap control means is disabled in case said drive control means is enabled.

11. A camera which employs said automatic focusing device defined in claim 2, wherein said certain time comprises a release-time-lag that occurs between a shutter operation and a start of an exposure.

12. The camera of claim 11, wherein an additional lens drive amount corresponding to said release-time-lag, is obtained by getting an average of a plurality of obtained release-time-lags that are consecutively obtained a predetermined number of times.

13. The automatic focusing device of claim 1, wherein said object is movable.

14. The automatic focusing device of claim 1, said drive control means determining a drive amount of said focus lens by utilizing a factor related to release time lag only when one of said directions is detected by said detecting means.

15. The automatic focusing device of claim 1, said drive control means comprising means for controlling said drive means for driving said focus lens to a predicted in-focus condition at the time of completion of lens drive when a predetermined one of said relative directions of movement is detected by said detecting means.

16. The automatic focusing device of claim 15, said drive control means comprising means for controlling said drive means for driving said focus lens to a predicted in-focus condition at the time of execution of exposure when a direction opposite said predetermined direction of movement is detected by said detecting means.

17. An automatic focusing device, comprising:
   means for detecting the relative direction of movement of an object with respect to said automatic focusing device from at least two relative directions; and
   means for controlling focusing of a lens associated with said automatic focusing device in response to said detecting means, so as to obtain an in-focus condition of said object with respect to said automatic focusing device, said focusing control means comprising means for controlling said focusing of said lens based upon an algorithm that is selected for use from a plurality of algorithms in accordance with said computed relative direction of movement of said object, wherein only one of said algorithms uses a factor related to release time lag.

18. The automatic focusing device of claim 17, wherein said controlling means determines said drive amount of said lens so as to bring said lens to said in-focus position with respect to said object at a time of completion of a driving of said lens when said relative direction of said object is determined to be moving away from said lens, said controlling means determining said drive amount of said lens so as to bring said lens to said in-focus position with respect to said object when a predetermined time elapses from completion of said lens drive when said relative direction of said object is determined to be approaching said lens.

19. The automatic focusing device of claim 17, further comprising means for checking whether a defocus amount obtained by a means for obtaining a defocus amount of said lens is effective, said controlling means being disabled if said checking means determines that said defocus amount is ineffective.

20. The automatic focusing device according to claim 18, further comprising means for determining whether said relative direction of movement of said object changes, said use of said selected algorithm being terminated when said determining means determines that said relative direction of movement of said object has changed.

21. The automatic focusing device of claim 17, wherein said object is movable.

22. The automatic focusing device according to claim 17, said focusing control means determines a drive amount of said focus lens by utilizing a factor related to release time lag only when one of said relative directions of movement is detected by said detecting means.

23. The automatic focusing device according to claim 17, said focus controlling means comprising means for controlling focusing of said lens to a predicted in-focus condition at the time of completion of lens drive when a predetermined one of said relative directions of movement is detected by said detecting means.

24. The automatic focusing device according to claim 23, said focus controlling means comprising means for controlling focusing of said focus lens to a predicted in-focus condition at the time of execution of exposure when a direction opposite said predetermined direction of movement is detected by said detecting means.

25. A method for automatically focusing upon an object, comprising the steps of:
obtaining a defocus amount of a lens that focuses upon the object, wherein a distance between the lens and the object is changeable;
determining the relative direction of movement of the object with respect to the focus lens from at least two relative directions, based upon the obtained defocus amount; and
controlling focusing of the lens based upon the determined relative direction of movement of the object, so as to obtain an in-focus condition of the object, the control of focusing of the lens being based upon an algorithm that is selected for use from a plurality of algorithms in accordance with the computed relative direction of movement of the object, wherein only one of said algorithms uses a factor related to release time lag.

26. The method of claim 18, wherein the step of controlling the focusing of the lens determines an amount to drive the lens so as to bring the lens to an in-focus position with respect to the at a time of completion of the driving of the lens, when the relative distance of the object is moving away from the lens, whereas the lens is driven by an amount that brings the lens to the in-focus position with respect to the when a predetermined time elapses from a completion of the lens drive when the relative distance of the object is approaching the lens.

27. The method of claim 25, further comprising the step of checking whether the obtained defocus amount is effective, the controlling of the focusing of the lens being disabled if the obtained defocus amount is ineffective.

28. The method of claim 25, further comprising the step of determining whether the relative direction of the object changes, the use of the selected algorithm being terminated when it is determined that the relative direction of movement of the object has changed.

29. The method of claim 25, wherein the defocus amount obtaining step obtains the defocus amount of an object which is movable.

30. The method for automatically focusing upon an object according to claim 25, said step of controlling focusing comprises determining a drive amount of the focus lens by utilizing a factor related to release time lag only when one of the relative directions of movement is detected by the determining step.

31. The method for automatically focusing according to claim 25, said step of controlling focusing comprising controlling driving of the focus lens to a predicted in-focus condition at the time of completion of a lens drive when a predetermined one of said relative directions of movement is determined by said determining step.

32. The method for automatically focusing according to claim 31, said step of controlling focusing comprising means for controlling focusing of the focus lens to a predicted in-focus condition at the time of execution of exposure when a direction opposite said predetermined direction of movement is detected by the determining step.

* * * * *

UNITED STATES PATENT AND TRADEMARK OFFICE
CERTIFICATE OF CORRECTION

PATENT NO. : 5,291,235
DATED : March 1, 1994
INVENTOR(S) : Yukio UENAKA

It is certified that error appears in the above-indentified patent and that said Letters Patent is hereby corrected as shown below:

At column 24, line 15 (claim 9, line 7), change "id" to ----is----.
At column 26, line 12 (claim 26, line 1), change "18" to ----25----.

Signed and Sealed this

Eleventh Day of July, 1995

Attest:

BRUCE LEHMAN

*Attesting Officer*      *Commissioner of Patents and Trademarks*